US006651800B2

(12) United States Patent
Baclija et al.

(10) Patent No.: US 6,651,800 B2
(45) Date of Patent: Nov. 25, 2003

(54) OBJECT ORIENTATION SYSTEM

(75) Inventors: Petar Baclija, Toronto (CA); Michael Elent, Thornhill (CA); Peter Guttinger, Milton (CA)

(73) Assignee: Langen Packaging Inc., Mississauga (CA)

( * ) Notice: Subject to any disclaimer, the term of this patent is extended or adjusted under 35 U.S.C. 154(b) by 0 days.

(21) Appl. No.: 09/780,481

(22) Filed: Feb. 12, 2001

(65) Prior Publication Data

US 2002/0110448 A1 Aug. 15, 2002

(51) Int. Cl.[7] .................................. B65G 47/22
(52) U.S. Cl. .................. 198/395; 198/394; 198/382; 414/774; 414/783
(58) Field of Search ................... 414/783, 759, 414/761, 763, 773, 774, 736, 737, 738; 198/577, 382, 394, 395

(56) References Cited

U.S. PATENT DOCUMENTS

| | | | |
|---|---|---|---|
| 2,915,308 A | | 12/1959 | Matzen |
| 3,026,989 A | * | 3/1962 | Schaltegger ............... 414/737 |
| 3,633,470 A | | 1/1972 | Bingham |
| 4,050,574 A | * | 9/1977 | Chenevard et al. ......... 414/763 |
| 4,178,839 A | | 12/1979 | Hughes |
| 4,197,790 A | | 4/1980 | Dietrich et al. |
| 4,298,422 A | | 11/1981 | Zodrow |
| 4,596,545 A | | 6/1986 | Greenwell |
| 4,653,628 A | * | 3/1987 | Claypool et al. ........... 198/395 |
| 4,655,338 A | * | 4/1987 | Hershey et al. ............. 198/395 |
| 4,822,234 A | * | 4/1989 | Johnson et al. ............. 414/737 |
| 4,874,076 A | * | 10/1989 | Kaplan et al. .............. 414/737 |
| 4,902,192 A | * | 2/1990 | Ziegler ........................ 414/736 |
| 5,139,132 A | * | 8/1992 | Licht .......................... 198/376 |
| 5,255,775 A | * | 10/1993 | Buehren et al. ............ 198/395 |
| 5,421,447 A | * | 6/1995 | Ruth et al. ................ 198/377.1 |
| 5,487,257 A | * | 1/1996 | Domeier et al. ............ 414/736 |
| 5,636,494 A | * | 6/1997 | Black, Jr. ..................... 53/399 |
| 5,833,045 A | * | 11/1998 | Osti et al. ................... 198/577 |
| 5,910,078 A | * | 6/1999 | Guttingert et al. .......... 414/736 |
| 5,975,278 A | * | 11/1999 | Ruth ....................... 198/377.01 |
| 5,997,458 A | * | 12/1999 | Guttinger et al. ........... 414/736 |
| 6,374,984 B1 | * | 4/2002 | Nagler ....................... 198/382 |
| 6,398,007 B1 | * | 6/2002 | Yamada ..................... 198/399 |

FOREIGN PATENT DOCUMENTS

JP         362036220 A   *   2/1987    ................. 414/763

* cited by examiner

*Primary Examiner*—Kathy Matecki
*Assistant Examiner*—Sang Kim
(74) *Attorney, Agent, or Firm*—Antonelli, Terry, Stout & Kraus, LLP

(57) ABSTRACT

A system can re-orient a series of objects, such as containers, including pouches, from a first orientation that is one of several possible orientations, to a pre-selected second orientation. The system includes an orientation apparatus that can move a series of objects from their first orientation to the pre-selected second orientation by a movement sequence. The system includes a sensor system, such as a vision system, for detecting which of said several orientations is the first orientation. The orientation apparatus responds to a signal from said sensor, and performs a pre-determined movement sequence based on the detected first orientation.

61 Claims, 29 Drawing Sheets

1.1 SEC 1.2 SEC

OBJECT ORIENTATION SYSTEM

FIELD OF THE INVENTION

This invention relates to an object orientation system. In particular, the invention relates to a method and apparatus for ensuring that an object, which is in one of several orientations, if moved as necessary to place it in a pre-determined orientation.

BACKGROUND OF THE INVENTION

In some fields, it is desirable to be able to take one or more objects, which are randomly delivered in one of several orientations, and then re-orient each object so that the objects are in a pre-determined or desired and, typically but not necessarily common, orientation.

For example, in the tea business, tea is often delivered to customers in a box. Inside the box are contained several packets or pouches, typically each pouch containing a tea bag, or possibly loose tea. These pouches usually have printing on their exterior surface, such as providing the brand or company name, the type of tea and usually some sort of design which is meant to provide an appearance that is attractive to the customer.

It is of course desirable that each of the pouches be contained in the box in the same, proper orientation. It is preferred that the boxes be loaded with all of the pouches intended for that box at one time, and this be performed by a loader.

A difficulty with being able to accomplish this objective, is that prior to loading into the box, each of the pouches must be oriented the same way. However, to the inventors' knowledge, no fast and efficient apparatus has heretofore been created which can receive the pouches in one of four possible orientations, and then move each pouch into a common, pre-determined orientation. Indeed, standard practice in the tea packaging industry is to utilize hand labour to fill the boxes with pouches all oriented in the same way.

In other environments, it may not be desired that each object such as a pouch or other type of container be put into the same orientation. For example, it may be desirable that every other object in a series be moved into one orientation, and the other objects be placed into another orientation.

SUMMARY OF THE INVENTION

According to one aspect of the present invention, there is provided a system for orienting an object from a first orientation that is one of several possible orientations, to a pre-selected second orientation, said system comprising: (a) an orientation apparatus for moving an object from said first orientation which is one of said several possible orientations, to said pre-selected second orientation; (b) a sensor system for detecting which of said several orientations is said first orientation; said orientation apparatus operable to respond to a signal from said sensor and to perform a pre-determined movement sequence on said object related to said detected first orientation, to move said object from said detected first orientation to said second orientation.

According to another aspect of the present invention, there is provided a method of orienting a series of objects from a first orientation which is one of several possible orientations, to a second orientation, the method comprising the steps of: (a) delivering the objects in series to a first station; (b) at said first station identifying which of said several possible orientations is said first orientation of each of said objects of said series of objects; based on said first orientation of each of said objects of said series, performing one of several operational sequences to move each of said objects of said series so that each of said objects of said series is moved into said second orientation.

DETAILED DESCRIPTION OF THE PREFERRED EMBODIMENTS

Figure 1:
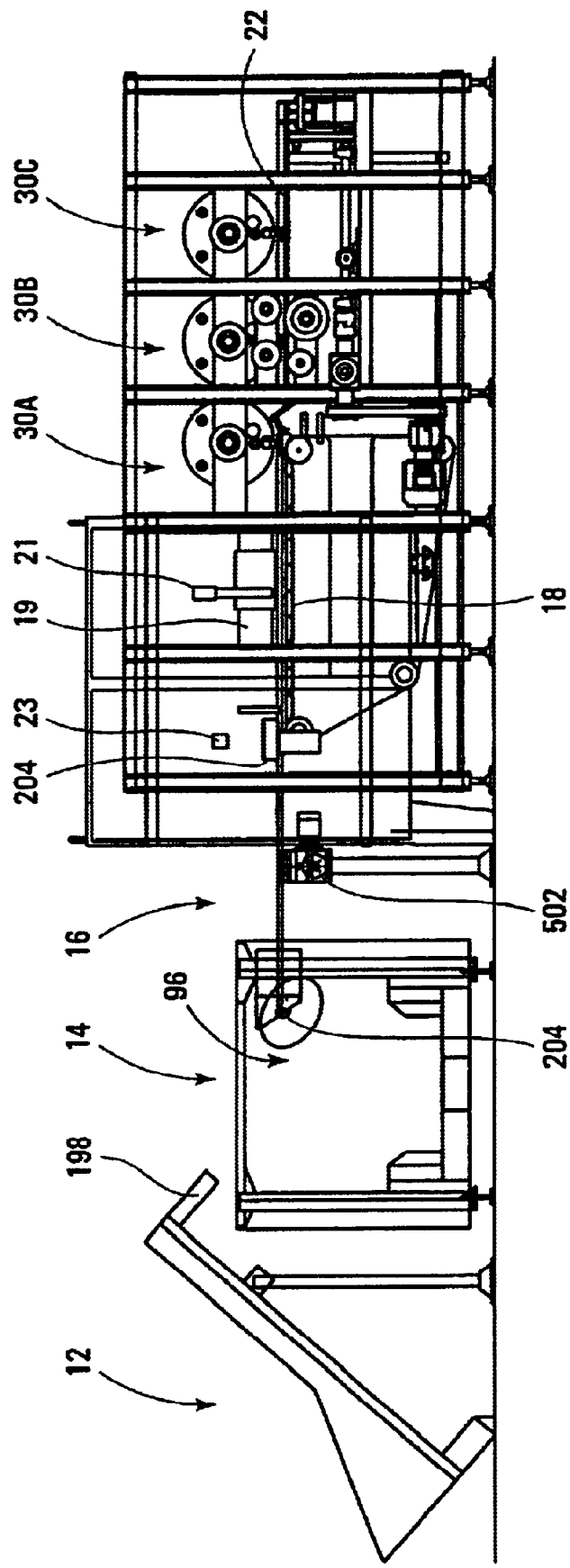
FIG. 1 is a side elevation view of a pouch orientation system.
Figure 2:
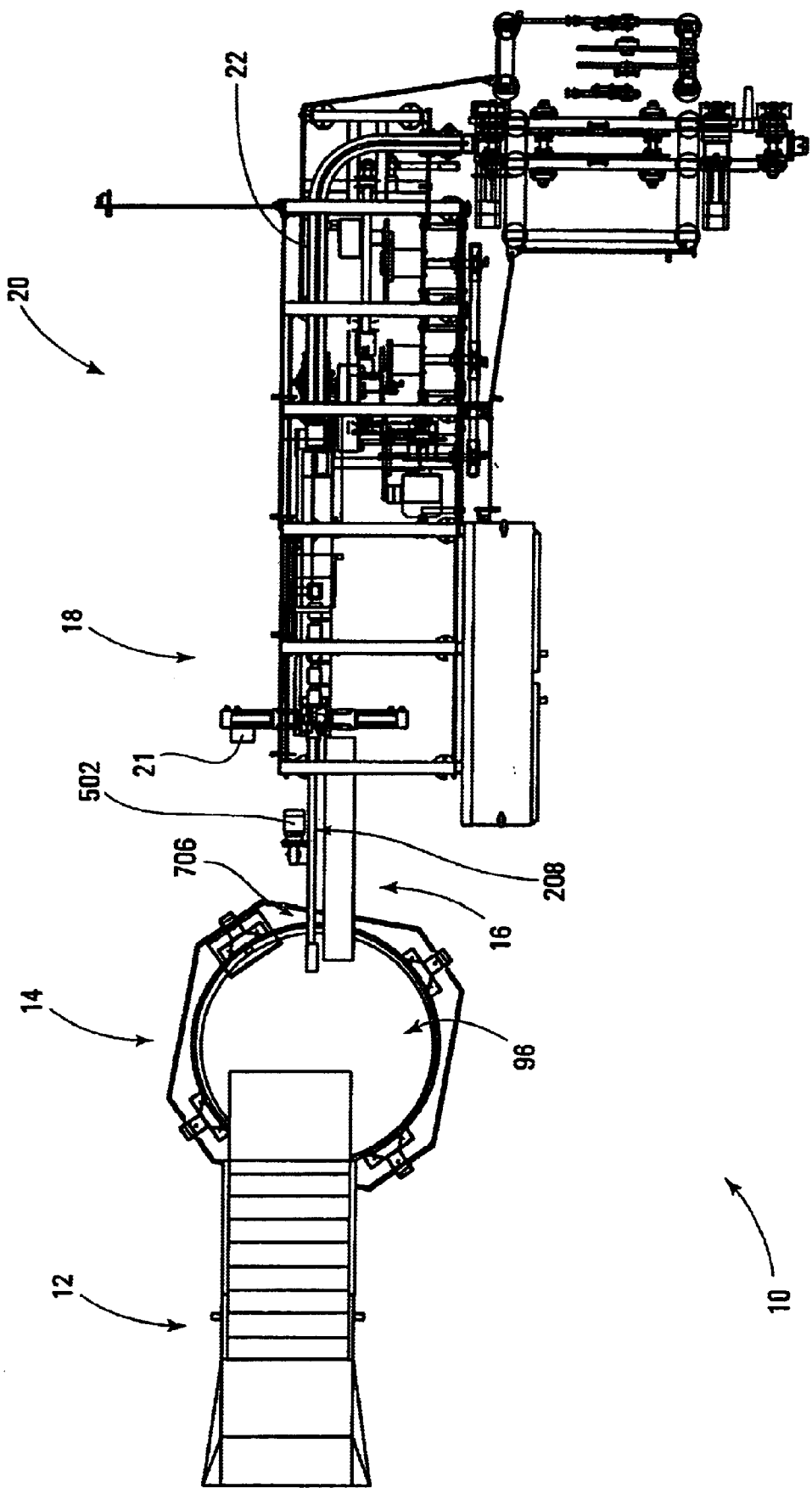
FIG. 2 is a top plan view of the pouch orientation system of FIG. 1.

With reference to FIGS. 1 and 2, the preferred embodiment of the invention is a pouch orientation system 10, for orienting a series of pouches such as pouches containing tea or tea bags (not shown in FIGS. 1 and 2). Each of the pouches can be oriented from one of four longitudinal orientations to a common, pre-selected transverse orientation. System 10 includes a pouch pre-feeder 12, a pouch feeder 14, a conveyor 16, a linear servo delivery conveyor 18, an orientation apparatus 20 and a discharge conveyor 22.

Figure 12:
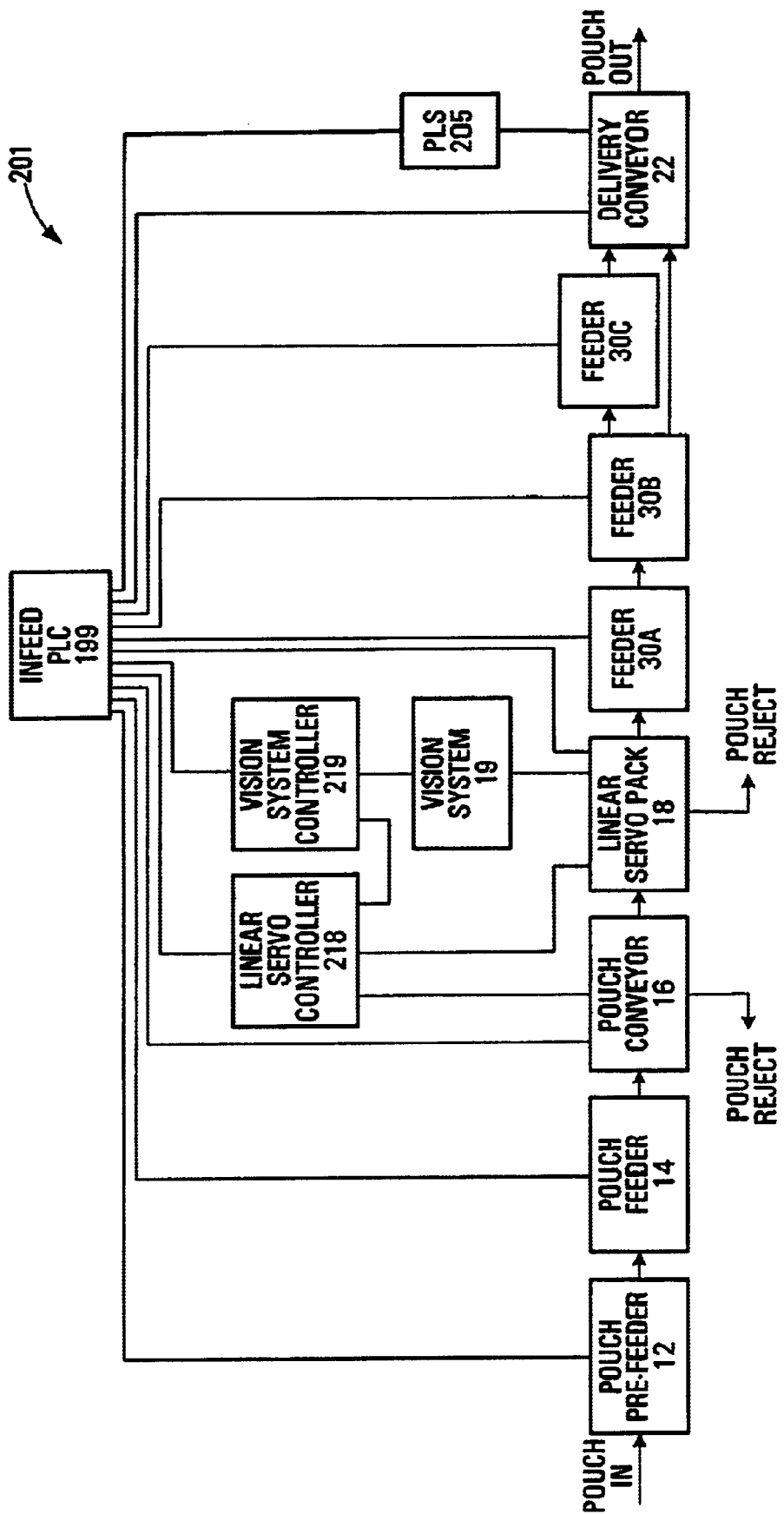
FIG. 12 is a block diagram showing the computer control system for the system of FIG. 1.

An example of a suitable pouch pre-feeder 12 is the model SB-6 manufactured by Hoppmann. It is adapted to feed pouches, such as packets of tea, to the pouch feeder 14. Pre-feeder 12 operates on demand when signaled to do so by the system PLC 199 (FIG. 12). Pre-feeder will load pouches into feeder 14 by way of a chute 198 hanging over the opening to drum 196 of feeder 14.

Pouch feeder 14 can be a feeder such as the model FV-50 centrifugal feeder, also made by Hoppmann. Feeder 14 is capable of sensing when it is running low of pouches 13 in its hopper. Feeder 14 is adapted to do this by providing a sensor (not shown) at the circumferential side of the drum 196 (which rotates relative to the sensor). The sensor sends, for example, 100 pulses to PLC 199, each pulse corresponding to a reading, for each revolution of the drum. The sensor will identify whether a pouch was sensed for each of the 100 readings. If the number of readings of a pouch for each drum revolution falls below an acceptable limit (eg. only 50 times of the 100 readings a pouch is sensed), the PLC 199 will communicate with the pre-feeder 12 to feed pouches into the drum 196. Once the sensor in drum 196 identifies a higher number of pouch readings (eg. 90), per 100 readings, feeder 14 is considered to sufficiently filled, PLC 199 will turn off pre-feeder 12.

Pouch feeder 14 will, by centrifugal action, force pouches that are fed into it by the pre-feeder 12, to the outer rim of a drum, placing them on edge, where pouches 13 are then fed singularly onto conveyor 16 by means of a rotating turret with suction cups on it. The suction cups will sequentially take a pouch from the wall of the drum and lift it up to deposit at the inlet to conveyor 16. The pouches 13 are fed from feeder 14 to conveyor 16 at a somewhat irregular pitch. Also, in this preferred embodiment the pouches 13 are all oriented longitudinally (ie. the longitudinal axis of each pouch is aligned with the direction of movement of the conveyor). However, the specific orientation of each pouch 13 fed to conveyor 16 is not consistent; rather the orientation of the series of pouches on conveyor 16 varies randomly between one of four possible orientations (ie. a pouch can only be supported on conveyor 16 on its two flat sides—and on each of those two sides, it can be oriented in one of two possible ways longitudinally).

Figure 2A:
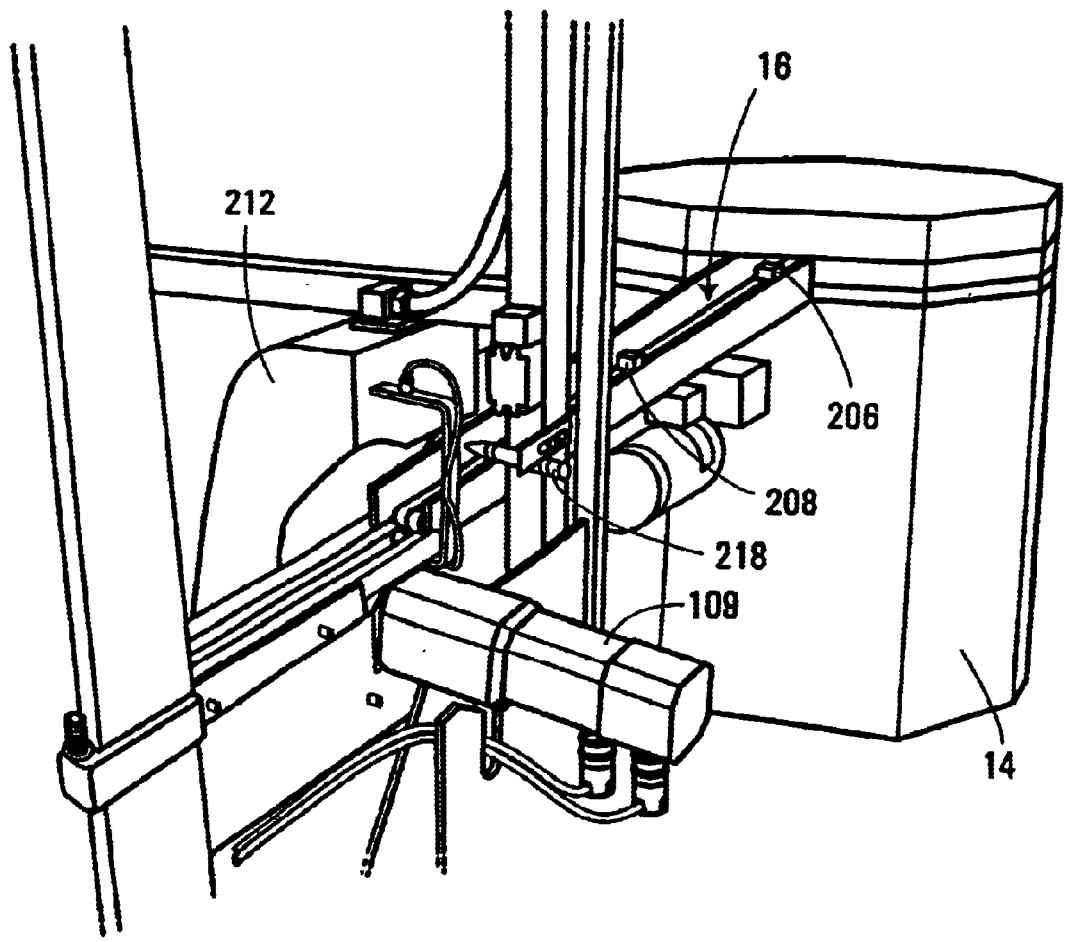
FIG. 2A is a sketch perspective view of part of the orientation system of FIG. 1.
Figure 2B:
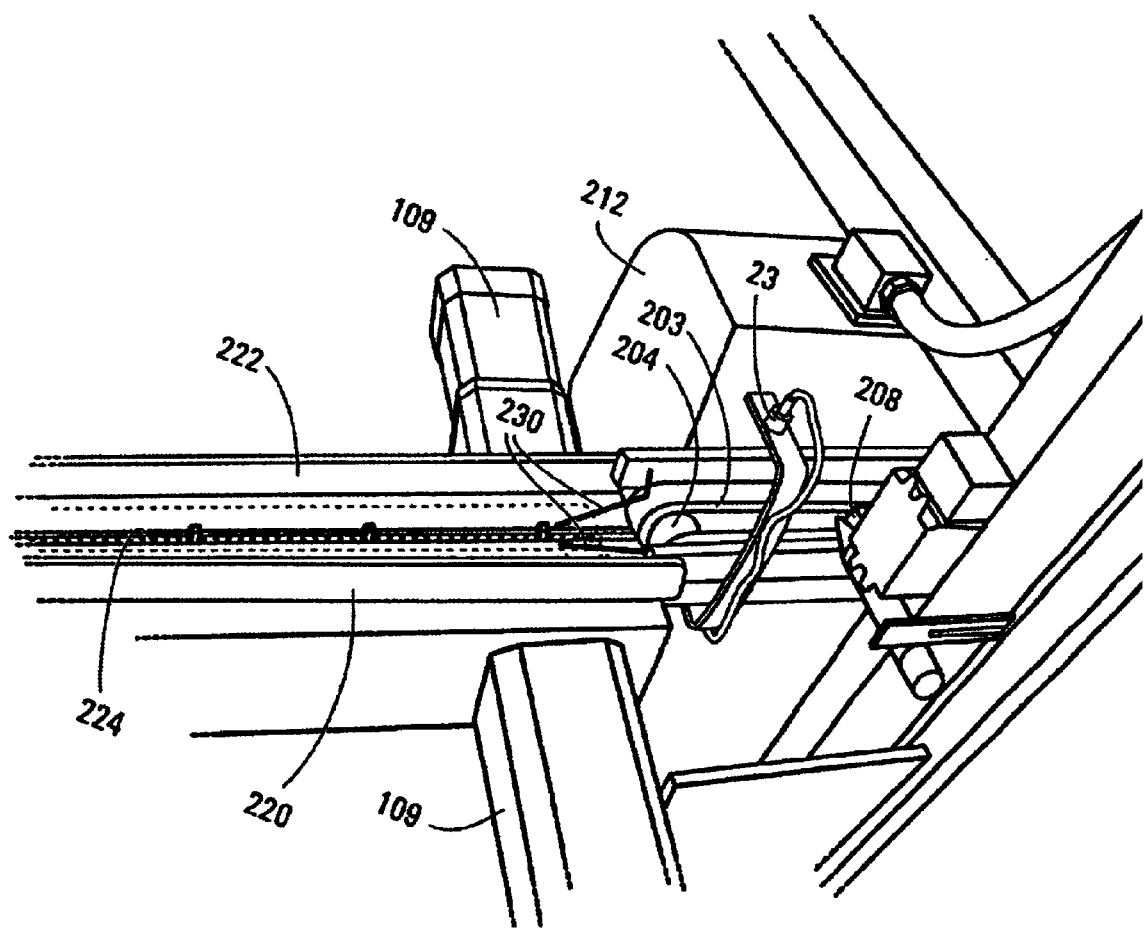
FIG. 2B is a sketch perspective view similar to that of FIG. 2A.

With reference to FIGS. 1, 2, 2A and 2B, conveyor 16 is a standard continuous belt conveyor able to carry pouches on the upper surface of a pair of spaced apart belts 203 (FIG. 2B). Conveyor belts 203 stretch between a pair of rotatable drums and are driven by a drive motor 502. Conveyor 16 runs at a constant speed on a constant path, and so will deliver pouches at a pitch and orientation as described above, to linear servo conveyor 18.

Conveyor 16 has several visual sensors associated with it, along its length. Two sets of sensors are provided to monitor the status of the pouches being delivered from feeder 14, that are carried by conveyor 16. A first set of sensors at positioned toward the inlet to conveyor 16 from feeder 14 and may comprise for example a pair of electronic eyes and a timer associated therewith. By sensing the movement of pouches past the two eyes and the time it takes the PLC 199 can determine whether (1) two pouches are too close together to be handled downstream by the system and (2) whether the feeder actually delivered two pouches at the same time to conveyor 16.

A second set of sensors downstream may comprise a set of three sensors arranged at positions so that they can sense if more than one pouch is being carried in substantially the same space (eg. one pouch is sitting in overlapping relationship to another) or again if two pouches are too close to each other.

In either case where there is the detection of pouches that are not properly configured or oriented, then PLC activates the appropriate set of blow off nozzles to reject the undesirable pouches. As shown in FIG. 2A, by way of example, one blow off nozzle is located beneath the two belts 203 and a second blow off nozzle is directed horizontally toward the opening of a pouch chute 212. When activated by PLC 199, the blow off nozzles will blast an undesirable pouch from below lifting it up and sideways into chute opening, where the undesired pouch is directed so it can possibly be re-used. Such a reject apparatus can be provided in association with the first set of sensors 206 located near the inlet of conveyor 16.

A further visual sensor 23, such as a beam type photo eye made by Allen Bradley under model number 42KL-G1LB-F4 is located at the end of conveyor 16. The visual sensor 23 is in communication with linear servo controller 218, which in turn is in communication with PLC 199 (FIG. 12). Sensor 23 can signal the linear servo pack controller 218 that a pouch is under the sensor at the end of conveyor 16 ready for delivery to conveyor 18.

Figure 2C:
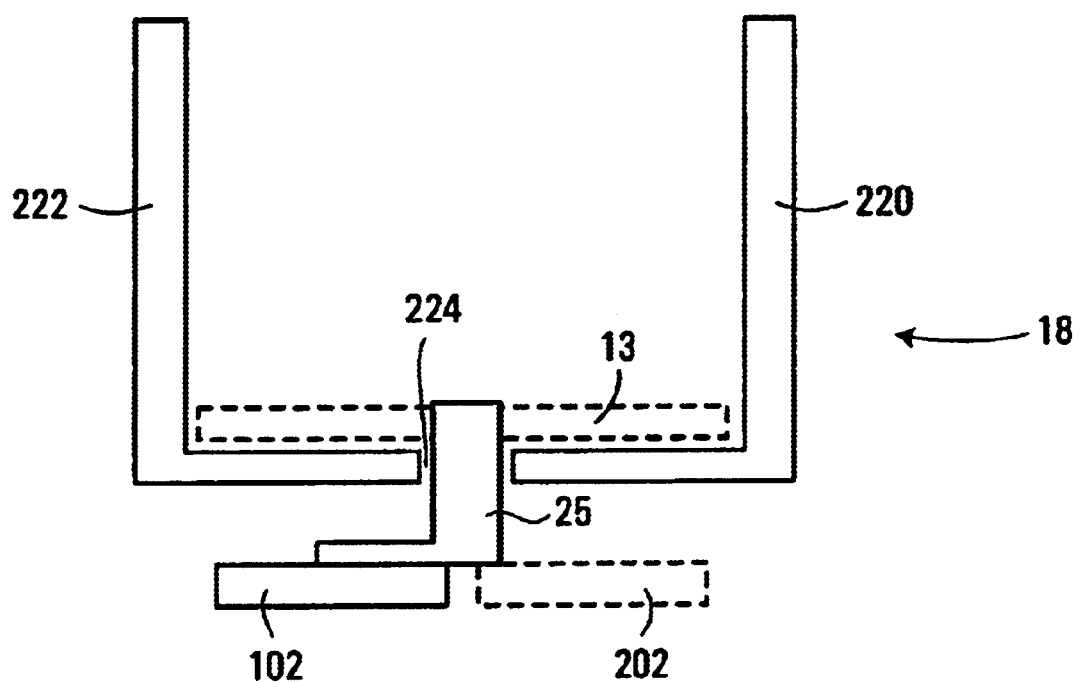
FIG. 2C is a cross sectional elevation view of a conveyor used in the system of FIG. 1.

Linear servo conveyor 18 comprises a pair of continuous conveyor belts 102, 202, running side by side and parallel to one another (FIG. 2C). The path of each belt 102, 202 is shown in the side view of FIG. 5E. Each belt 102, 202 drives a series of spaced pouch lugs 25. Lugs 25 from both belts 102, 202 extend upward through a slotted opening between two L-shaped channel members 220, 222. The transverse spacing of the L-shaped channel members 220, 222 and the longitudinal spacing of lugs 25 are such that pouches 13 can rest on the L-shaped members in front of a lug 25 in a lug pocket or space and thus be driven along on the L-shaped members by the lugs 25. On each belt 102, 202 the lugs 25 are grouped into two sets of lugs (such as for example a group of six lugs as shown in FIG. 5E) each set being spaced apart from each other both forwards and backwards along the belt. Each set of six lugs and associated lug pockets is referred to hereinafter as a servo pack train. Thus, on each belt 102, 202, each of the servo pack trains are spaced from each other in both forward and backwards directions on the belt.

The servo pack trains of one belt 102 are interleaved spatially with a corresponding servo pack trains of the other belt 202, even though each servo pack train on both belts follows the same conveyor path shown in FIG. 5E. Each belt 102, 202 is driven independently by a rotary servo motor 109 each having an associated planetary gear box and capable of varying its drive speed to vary the speed at which belts 102 and 202 are driven at. This permits one belt 102 to be driven so that its position and speed can be properly adjusted independently of the other belt 202. In addition to driving the belts 102, 202 at varying speeds, the belts can also be driven with intermittent movement, so that the belts do not have to move continuously when each servo pack is being loaded from conveyor 16 or unloaded by orientation apparatus 20.

Figure 11A:
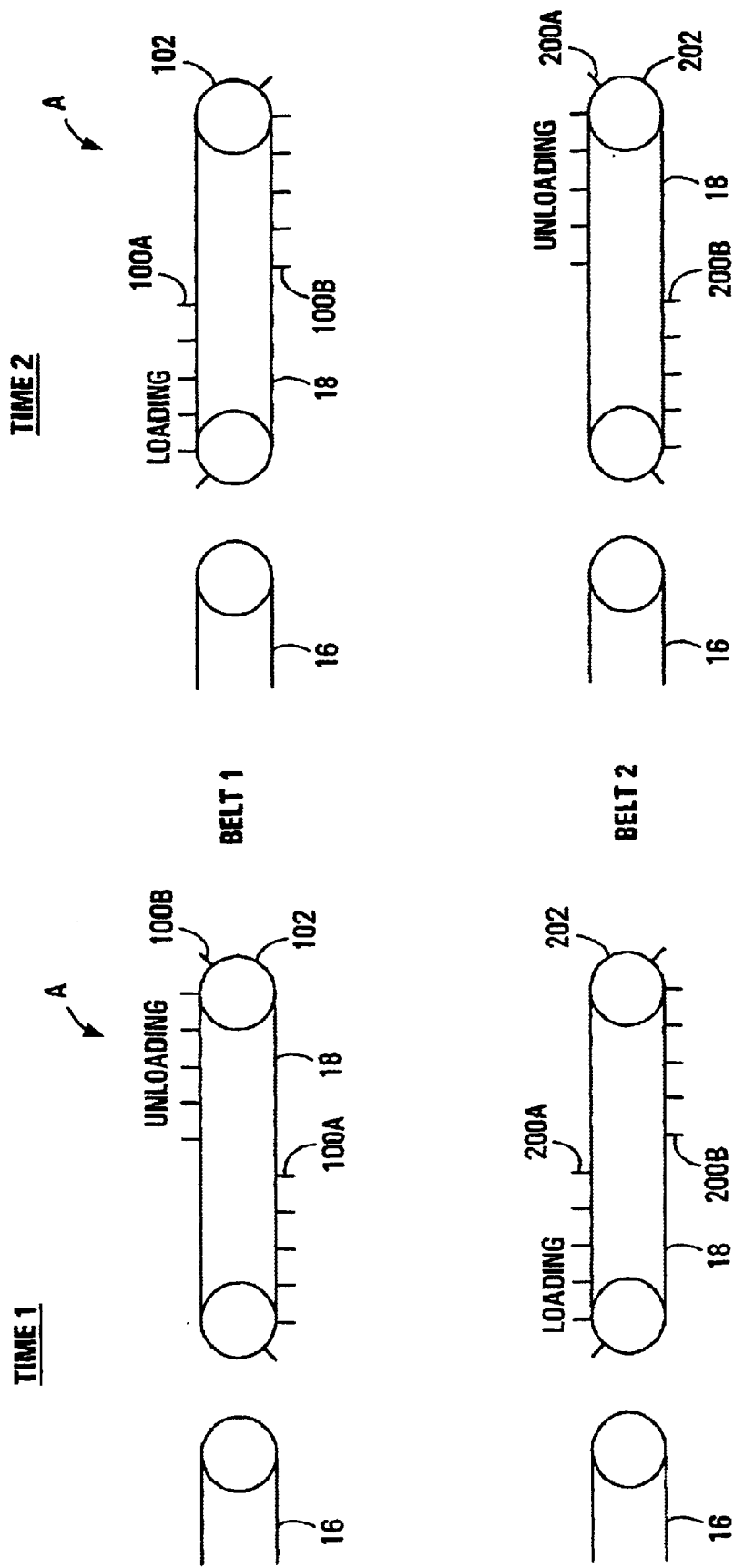
FIGS. 11a and 11b are schematic side views showing the sequence of movements of the conveyor of FIG. 5E.
Figure 11B:
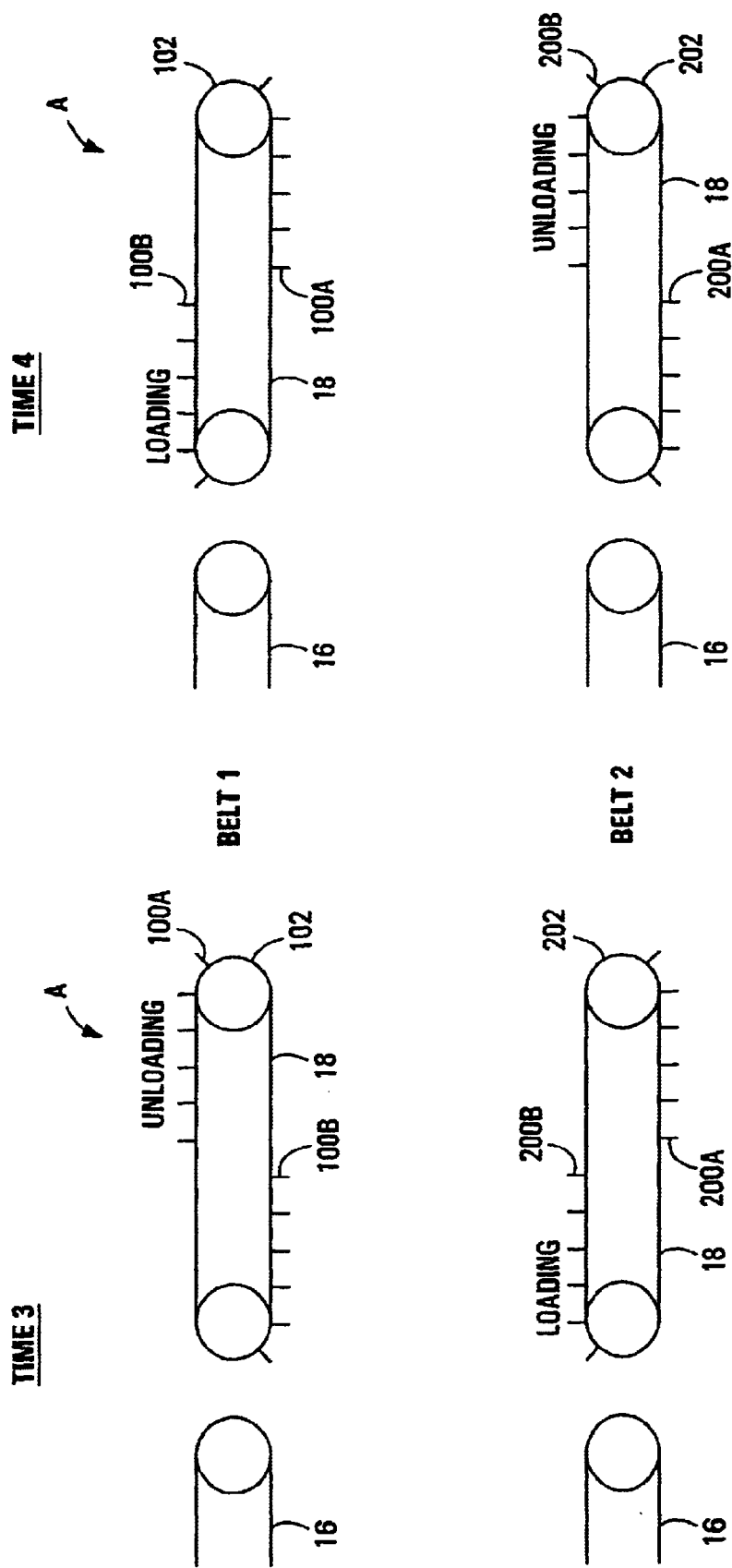

With reference to FIGS. 11A and 11B the sequence of operation is shown very schematically. In FIG. 11A at Time 1, a first servo pack train 200a from a first belt 202 is intermittently driven so that in turn each lug in the servo pack train engages one of a series of pouches 13 (not shown in FIGS. 11A and B) delivered from conveyor 16, thus loading the lug pockets of the servo pack train 200a. Contemporaneously, the other second belt 102 can be driven intermittently at location A in such a manner that it is delivers a series of pouches from a first servo pack train 100b to a pre-determined location A where they are unloaded by orientation apparatus 20. At location A, the lead portion of orientation apparatus 20 (in this case feeder 30a in FIGS. 5a and 5b) can pick up each of the pouches 13 in the first servo pack train 100b in turn.

Thus, once the first belt 202 carrying its first servo pack train 200a has been loaded with a series of pouches from conveyor 16, and the first servo pack train 100b of the second belt 102 has been unloaded of its pouches at location A, the first belt 202 is moved so that its first servo pack train 200a is at location A for unloading (Time 2). At the same Time 2, while the first servo pack train 100b on the second belt has cleared location A, the second servo pack train 100a on the second belt 102 moves into position for loading pouches from conveyor 16.

In the next sequence from Time 2 to Time 3, the first train 200a of first belt 202 clears location A and the second train 200b moves into position to receive pouches from conveyor 16. In the same time sequence from Time 2 to Time 3, train 100a of belt 102 clears the loading station and is moved to location A for unloading.

The next movement is shown at Time 4 where belt 202 has moved servo pack train 200a to a waiting position in advance of the loading station and servo pack train 200b to the unloading station. At the same time belt 102 has moved servo pack train 100a away from the unloading station and servo pack 100b to the loading station.

The movement of servo pack trains on a belt moves from loading position to location A will be continuous and relatively quick. The other trains on the other belt must be moved at a speed so as not to interfere with the movement of that first belt. The movement at the loading and unloading stations on the other hand is intermittent and in such a manner that pouches can be loaded and unloaded. It should be noted that in FIGS. 11a and 11b, the servo pack trains are shown very schematically and are not a true representation.

The result is that although pouches 13 may be delivered to servo conveyor 18 by conveyor 16 at an irregular pitch, the servo conveyor 18 deliver pouches to the pick up location at the proper time needed for pick up by the orientation apparatus 20.

In summary, the general purpose of servo conveyor 18 is to retrieve pouches from conveyor 16 as they arrive on conveyor 16 and then make an appropriately timed delivery of a suitable pouch 13 to a pick up location A that is synchronized with the movement of orientation apparatus 20.

A vision machine system 19 having an electronic eye or camera lens 21 is positioned above conveyor 18 and is adapted to detect specific indicia or markings on each pouch 13 that passes under eye 21 on conveyor 18. An example of a suitable vision machine and electronic eye are the model 630 DVT SmartImage sensor manufactured by DVT Corporation, a Model 13VA5-40 (5 mm–40 mm zoom lens) made by Pelc and the model 010-3000800 Northeast Robotics strobe light.

Vision system 19, in addition to being able to determine the orientation of a pouch 13 held in a lug pocket in a servopack train on conveyor 18, is also able to determine whether each such pouch is properly positioned on the conveyor (eg. is it mis-aligned, with its longitudinal axis not aligned with the direction of movement). Vision system 19 can also determine whether a pouch is damaged, if it is not the right type of pouch, or if a pouch is not present at all. If a pouch is does not meet the requirements for delivery to the orientation apparatus 20, the pouch will not be picked up by the orientation apparatus, and will be rejected at the end of the conveyor 18, where it can be channeled for re-cycling. With reference to FIGS. 5C, 5D and 5E, a chute 310 is positioned at the end of conveyor 18 in alignment with the direction of movement of pouches 13 on conveyor 18. A gate 316 is adapted to block and unblock the entrance to the chute 310. Gate 316 is interconnected to a pivot arm 320 and rotates between the open and closed positions shown in FIG. 5D. The movement of gate is controlled by PLC 199, which controls the piston 314. By simply indexing the pouch forward on conveyor 18 when gate 316 is open, the pouch can be deposited into chute 310.

A pouch 13 may be rejected at the end of conveyor 18 if PLC 199 has received a signal from machine vision system 19 and its associated controller 219, that the pouch in that particular pocket is not acceptable. A pouch may also be rejected in a situation where two pouches were delivered in error in the same lug pocket by conveyor 18 to location A. This may not have been picked up by machine vision system 19, which would only evaluate the top pouch in the pocket. However, eye sensor 312 will detect if a second pouch is still at the end of conveyor 18 abutting gate after a first pouch has been picked up by feeder 30a of orientation apparatus 20 and lifted clear of the pocket.

Figure 5A:
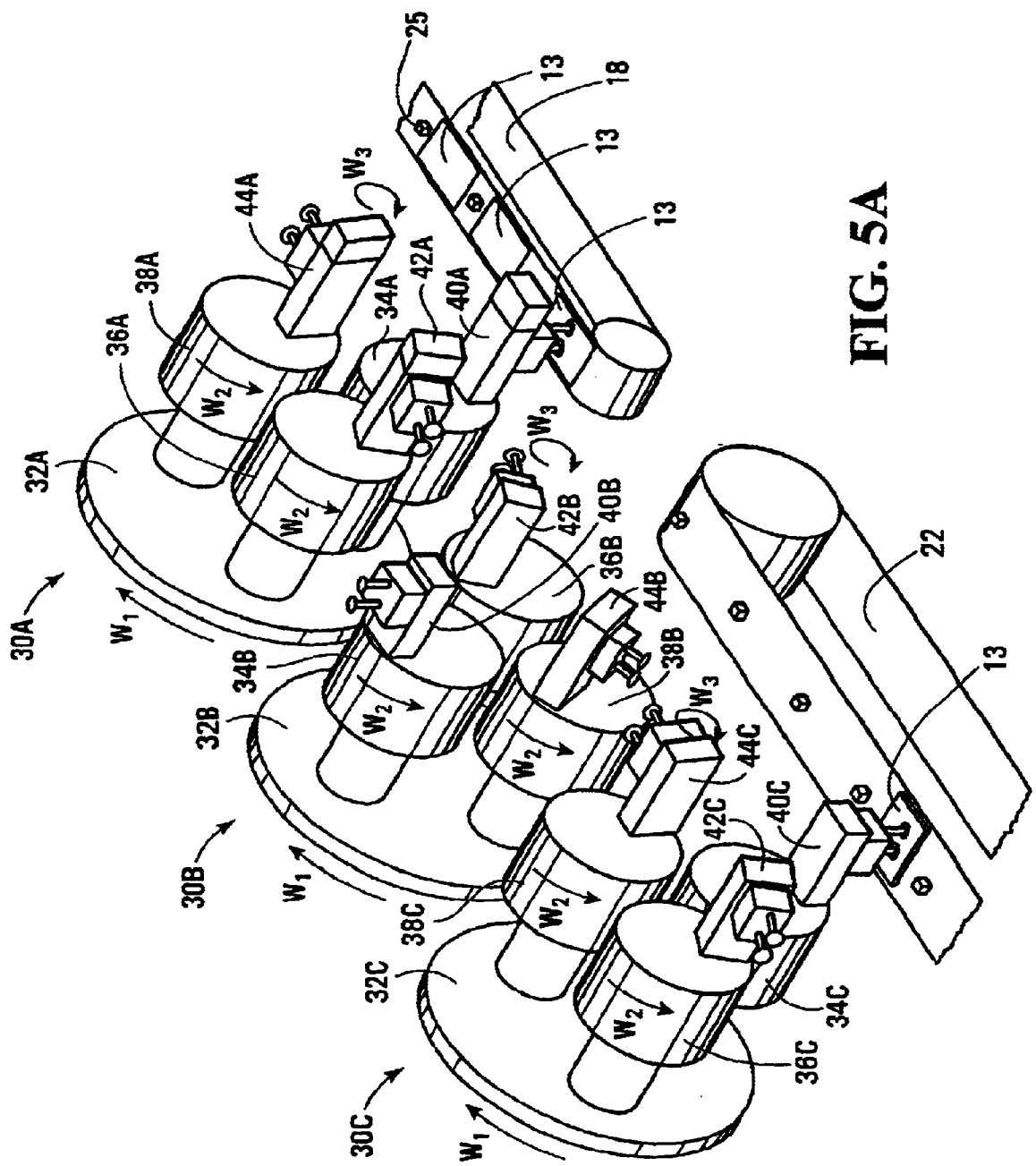
FIG. 5a is a schematic perspective view of the orientation apparatus of FIGS. 3a–3e.
Figure 5B:
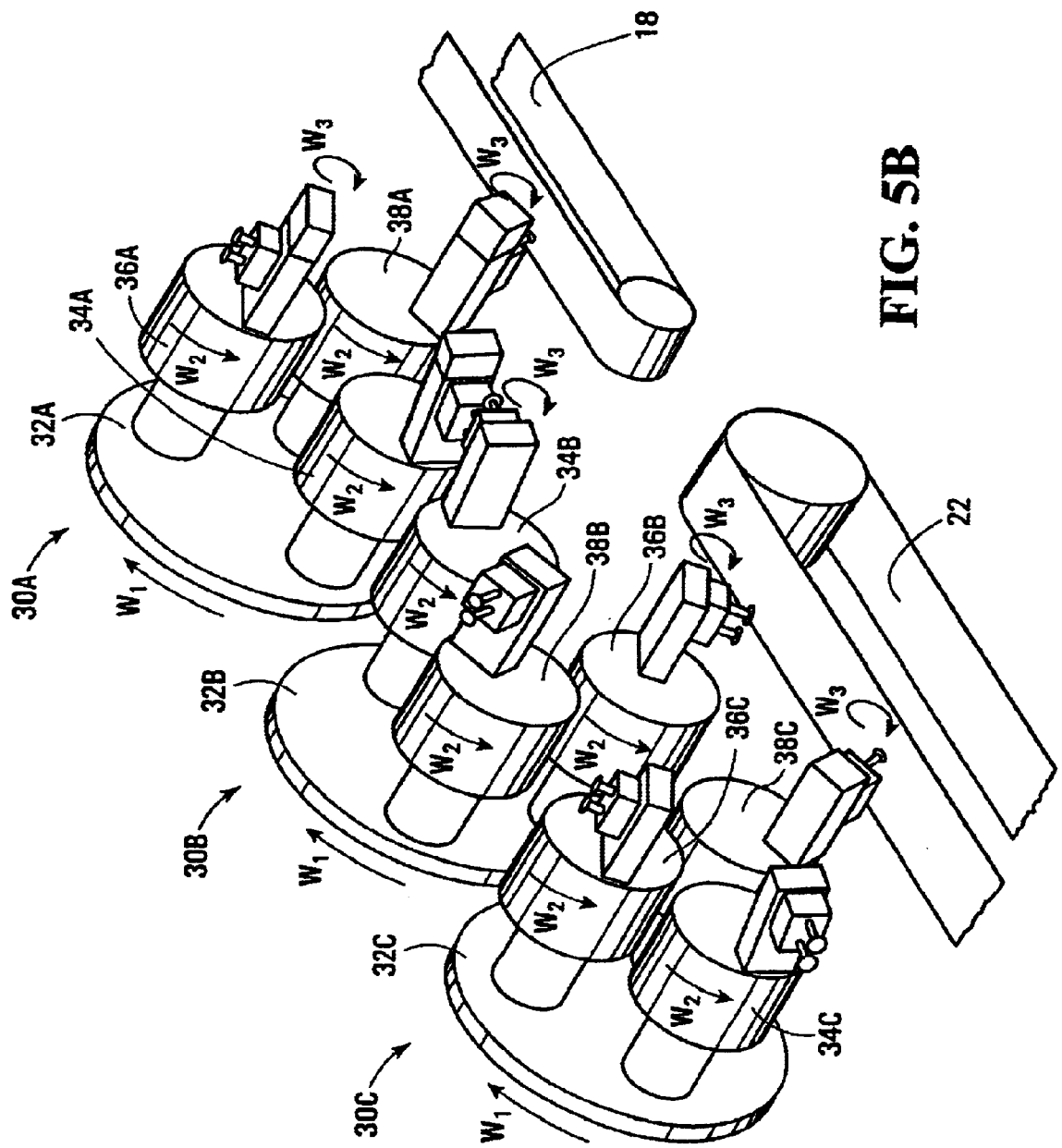
FIG. 5b is another schematic perspective view of the orientation apparatus of FIGS. 3a–3e.
Figure 5C:
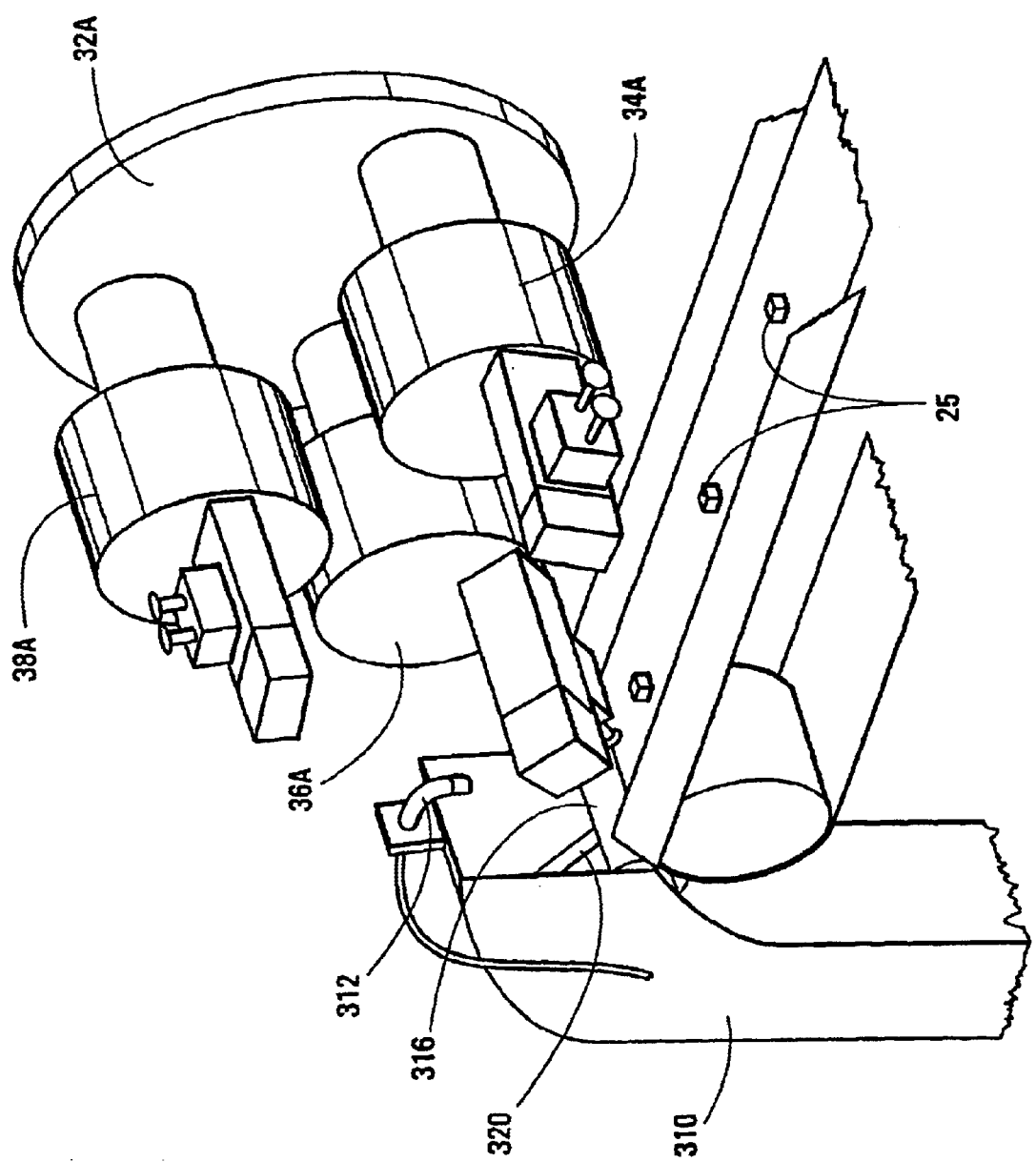
FIG. 5C is a sketch perspective view of part of the system of FIG. 1.
Figure 5D:
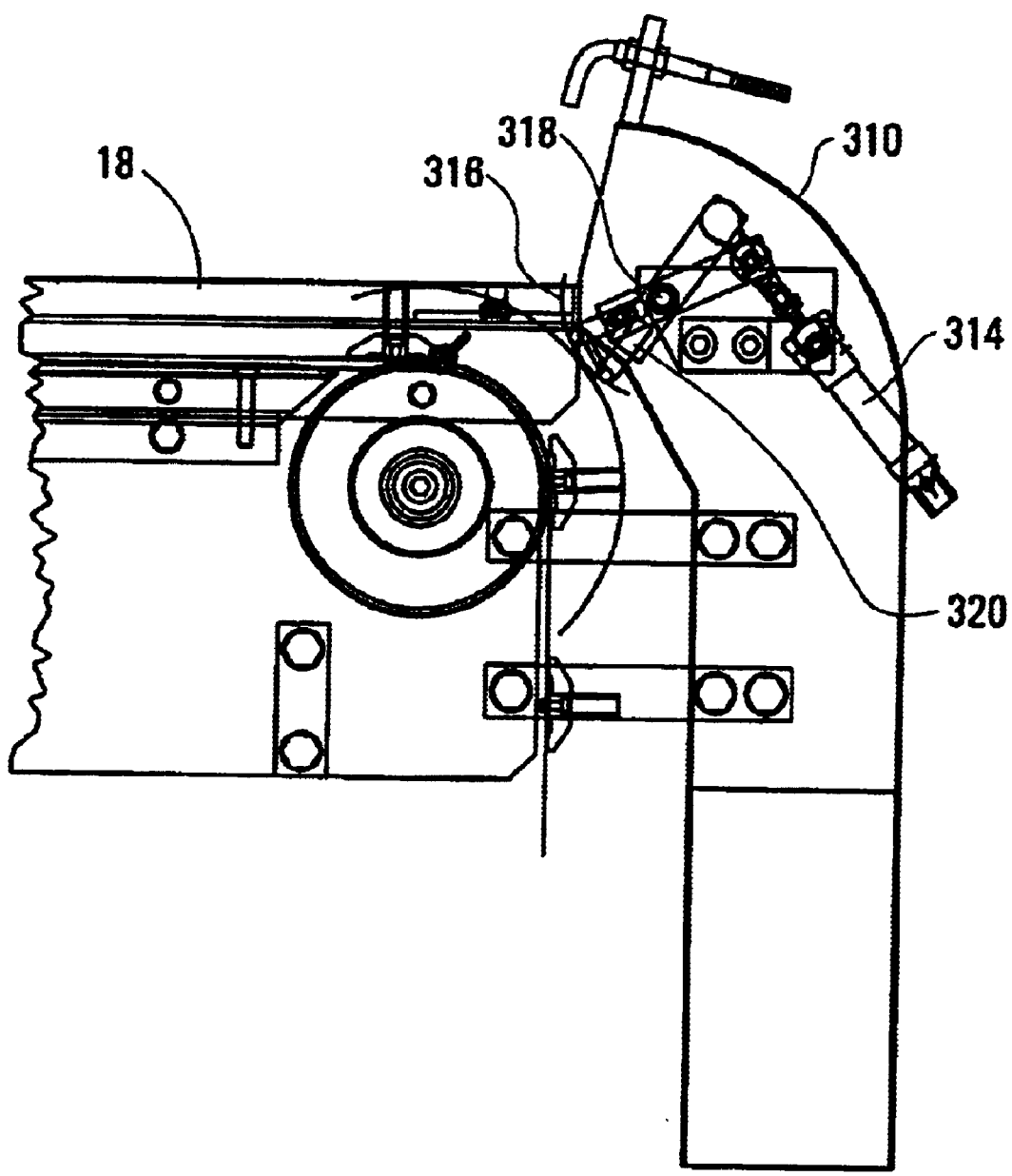
FIG. 5D is a schematic side view of some features in the part of the system shown in FIG. 5C.
Figure 5E:
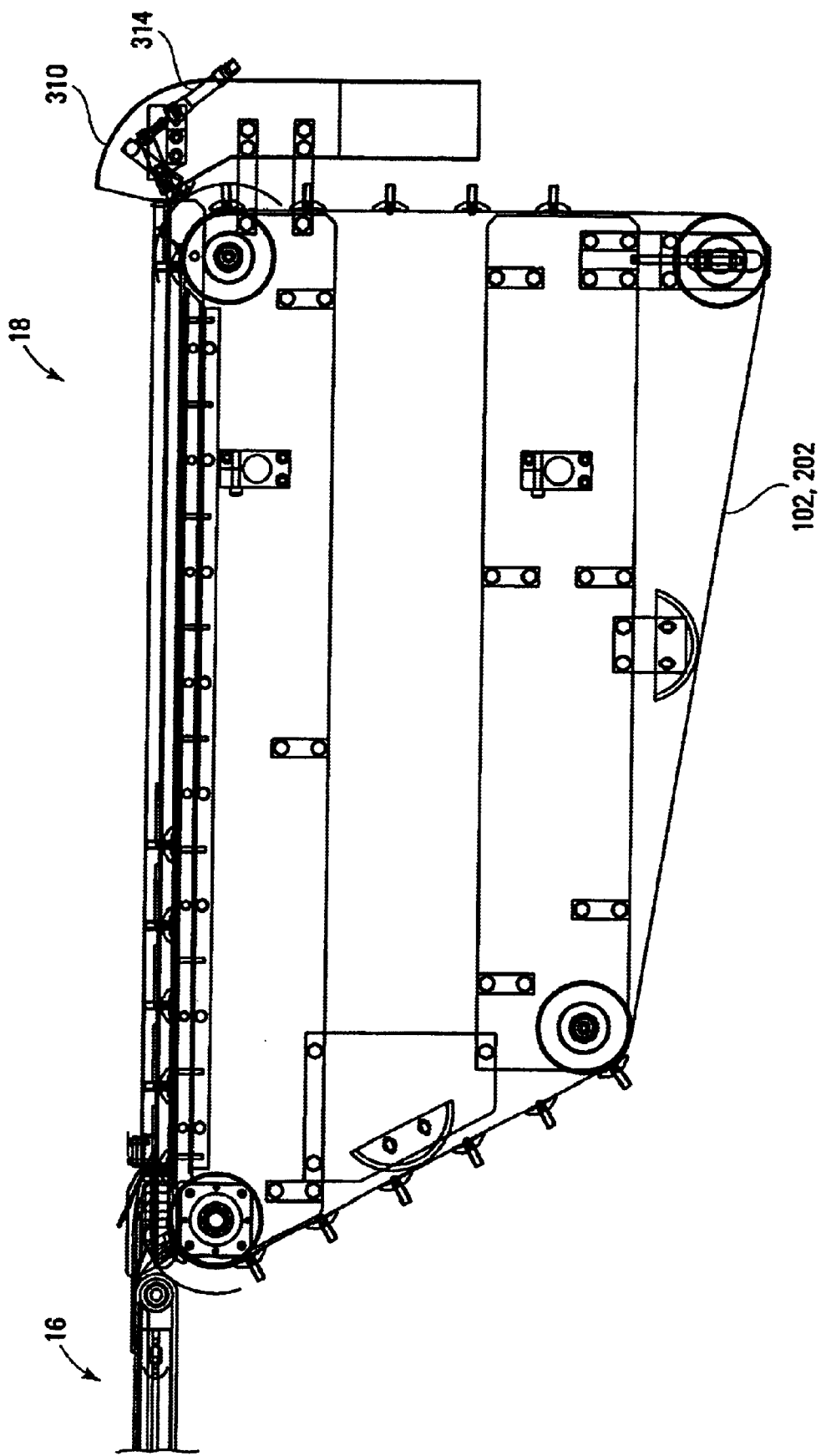
FIG. 5E is a side elevation diagram showing the layout of the conveyor of FIG. 2C, utilized in the system of FIG. 1.

Turning now to the orientation apparatus 20 and delivery conveyor 22, the latter is constructed in a manner similar to conveyor 18 (although this is not all shown in for example FIGS. 5a and 5b). Conveyor 22 has a pair of spaced L-channel members separated by a longitudinally extending slot. Conveyor 22 only requires one belt beneath the L-channel members, but that belt carries lugs that extend through the slot. Like conveyor 18, pouches can rest on the bases of the L-channel members, straddling the slot, and can be engaged from behind by the lugs 125 that protrude through the slot. Conveyor 22 is driven by a common belt drive mechanism that also drives the feeders 30a, 30b and 30c of orientation apparatus 20, as will be described later.

Referencing FIGS. 5a and 5b, orientation apparatus 20 is illustrated generally schematically. The apparatus 20 comprises three separate rotary feeders 30a, 30b and 30c. Each of feeders 30a, 30b and 30c is constructed substantially the same, although in the preferred embodiment, at least one of feeders 30a and 30b is equipped with a rotational feature that is not present in the other feeder(s), as will be described hereafter.

The following description of feeder 30a, generally also applies to feeders 30b and 30c. Feeder 30a has a carrier member 36a which is mounted for rotation on a main shaft 60 and has an angular velocity w1 about a sun axis (main shaft 60 is not shown in FIGS. 5a and 5b). Mounted to carrier member 32a are three planetary units 34a, 36a and 38a. Each planetary unit is constructed identically and they are spaced such that there are equal angles from the sun axis between them (ie. 120 degrees from center axis). Each planetary unit 34a, 36a and 38a is mounted for rotation about a planetary axis (which is parallel to and spaced from the sun axis) on a planetary shaft. The planetary units 34a, 36a and 38a will rotate at an angular velocity w2. Mounted on each planetary unit 34a, 36a and 38a is a moon unit (40a, 42a and 44a). Each moon unit is mounted on a moon shaft for rotation on said shaft at an angular velocity of w3 about a moon axis which is also parallel to the sun axis, and its respective planetary axis, but is spaced from both the sun axis and the planetary axis. The planetary axes and moon axes of each of the planetary and moon units of each feeder 30a, 30b and 30c are all parallel to each other and their sun axis. Likewise, the sun axes of all feeders are all parallel to each other. The direction of rotation of the planetary members, is opposite to the direction of rotation of the carrier member and the moon units.

Each moon unit 40a, 42a and 44a has a pick-up member. It should be noted that in the preferred embodiment the pick-up members of at least one of feeders 30a and 30b will have a functionality that is not required for feeder 30c.

Feeder 30a is positioned above conveyor 18 so that during rotation, the pick up members will be able to pick up, or attach to, a pouch on conveyor 18. Feeders 30b and 30c are positioned above conveyor 22 so that each can during rotation move through a position where a pouch carried by a pick up member can be deposited onto conveyor 22. The feeders are also positioned in series adjacent each other so that during rotation, pouches can transferred from feeder 30a to feeder 30b and from feeder 30b to feeder 30c. The paths of movement of each of the pick up members is shown in FIGS. 4, and 4A–L, and is described in more detail hereafter.

Figure 8:
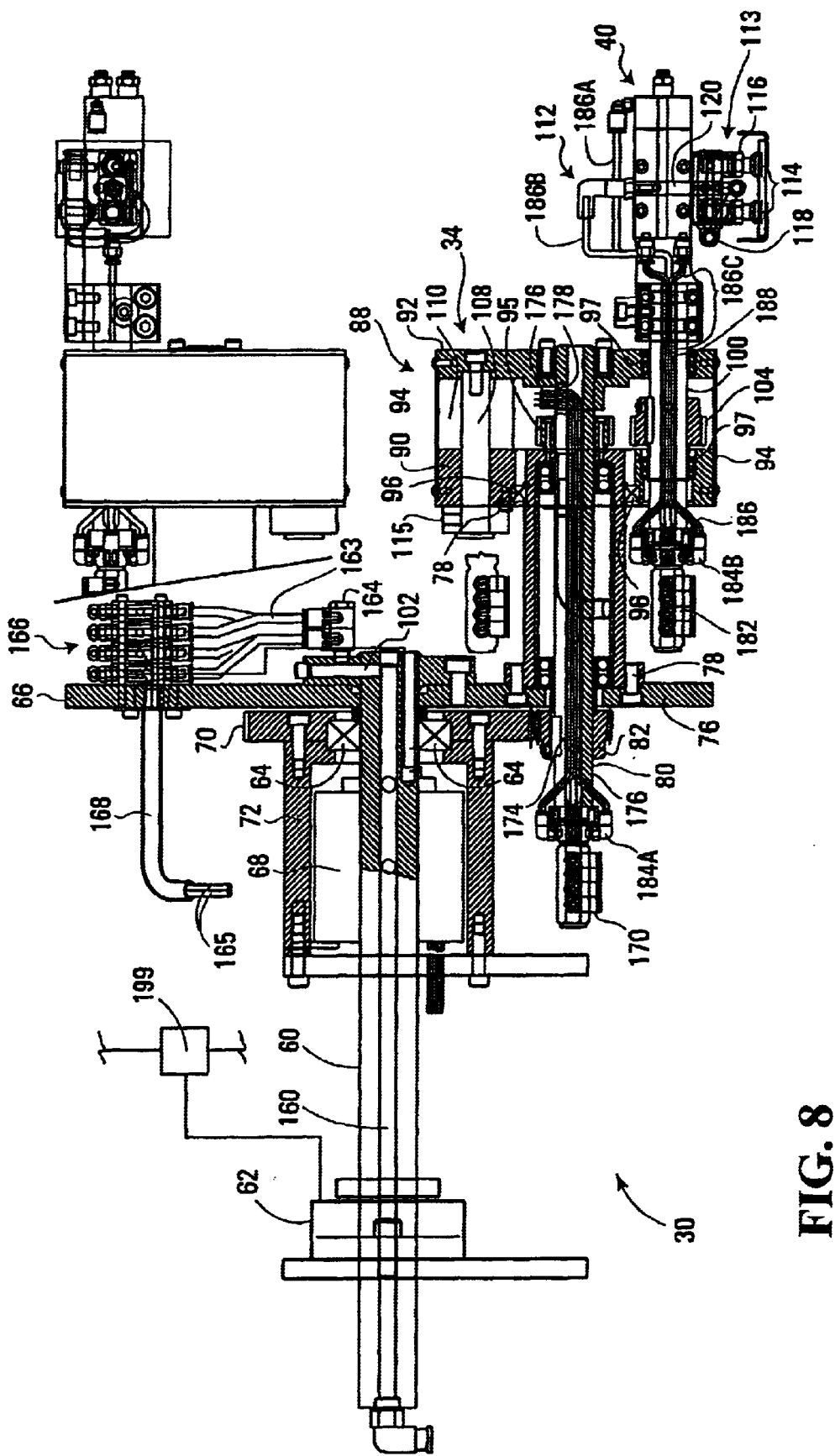
FIG. 8 is a detailed side view, shown partly in cross section, of part of the orientation apparatus of FIGS. 3a to 7.
Figure 9:
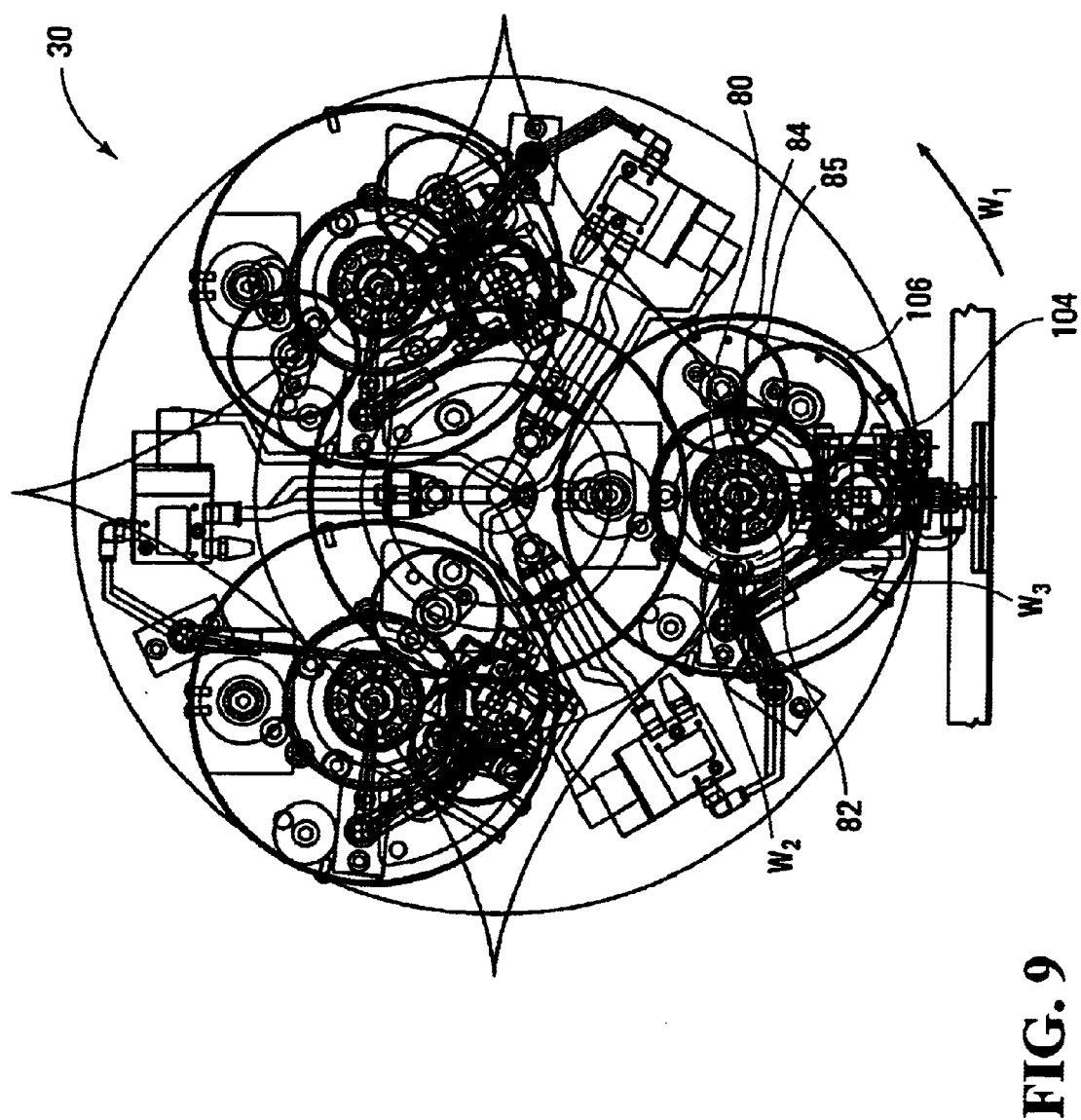
FIG. 9 is a front view at 9—9 in FIG. 8 but showing some of the hidden features.

FIGS. 8 and 9 illustrate in detail features of a representative feeder 30 (which is the precise configuration of feeder 30a and/or 30b and is very similar to the configuration of the other feeder(s)). Feeder 30 includes a main shaft 60 which is mounted for rotation in bearings 62 and 64. Proximate a front end of shaft 60 is fixed a carrier disc 66, which rotates with shaft 60. A sun gear 70 is mounted about the sun axis but is fixed to a support frame 72.

Evenly spaced around the disc 66 are three planetary units, one of which, unit 34 is illustrated in detail in FIG. 8. A bearing housing 76 is bolted securely to disc 66 and houses contact bearings 78 therein. Contact bearings 78 retain a planetary shaft 80. The shaft 80 has a rear portion, which extends through disc 66 and has a planetary gear 82 mounted around it in fixed relation toward its rear portion. As illustrated in FIG. 9, an idler gear 84 is mounted for rotation on disc 66. Idler gear 84 provides a linkage between sun gear 70 and planetary gear 82. Movement of shaft 80 around the sun axis as it is rotated by disc 66 and shaft 60, as disc 66 rotates at angular velocity w1, will cause idler gear to be rotated by and around sun gear 70, in the same rotational direction as disc 66. The rotation of idler gear 84 will impart a rotation in the opposite direction of planetary gear 82 and thus rotates planetary shaft 80 in the same direction as planetary gear 82 and at the same angular velocity w2. The relationship between the magnitude of the angular velocities w1 and w2 is determined by the relative diameters of sun gear 70 to planetary gear 82.

Fixed at the end of shaft 80, opposite to the end where gear 82 is situated, is a planetary body 88. Planetary body 88 and planetary shaft 80 comprise a planetary unit. Planetary body 88 is comprised of an inner planetary disc 90 and an outer planetary disc 92. Outer disc 92 is fixed to the end of shaft 80. The discs are interconnected by cover plate 94 and disc 90 is mounted on bearings 96 such that the discs 90 and 92 can rotate with shaft 80 about planetary axis and about bearing housing 76. Also, mounted between discs 90 and 92 and about shaft 80 is a second planetary gear 95. Second planetary gear 95 is secured to the end of bearing housing 76 and thus is fixed relative to disc 66.

On one side of shaft 80, a moon shaft 100 is mounted on two sets of bearings 97 through discs 90 and 92. Bearings 97 are supported by discs 90,92. Thus, moon shaft 100 is able to rotate relative to discs 90 and 92 about a moon axis. Mounted about shaft 100 between discs 90 and 92 is a moon gear 104. Disposed between second planetary gear 95 and moon gear 104 and linking the same, is a moon idler 106. As planetary shaft 80 and planetary body 88 are rotated around sun axis by the rotation of carrier disc 66, moon idler 106 is rotated in a direction opposite to that of carrier disc 66 as it is engaged by and rotates on second planetary gear 95. In other words, moon idler 106 is forced to rotate as it moves around second planetary gear 95. The rotation of moon idler 106, as it is engaged by second planetary gear 95, imparts a rotation w3 on moon gear 104 in the opposite direction as the planetary unit (ie. the same direction as carrier disc 66), thus causing moon shaft 100 (which is fixed relative to moon gear 104) to rotate in the same direction and resulting in the rotation of the moon body 40 to rotate with moon shaft 100.

Positioned on the opposite side of planetary shaft 80 to moon shaft 100, between discs 90 and 92 is a balance block 110 and a balance shaft 108, the latter having a balance block 115 mounted about it at one end. The block 115 is positioned against an outer face of disc 90. The purpose of these balancing components is to provide a counterbalancing force and provide for substantially even loading of the planetary unit 34 as it rotates with planetary shaft 80 about the planetary axis.

Moon shaft 100 and moon body 40, comprise together a moon unit. Mounted at the front end of moon shaft 100 is the moon body 40, having a pick up apparatus generally designated 112, which includes a suction head 113. The suction head 113 includes vacuum suction cups 114, a vacuum block 116 and a vacuum generator 118 such as for example, a vacuum generator manufactured by Pisco™ Pneumatic Equipment under model number VCL10-016LJ. This particular vacuum generator 118 is a venturi vacuum generator that uses positive pressurized air at an inlet and converts it into a vacuum at an outlet. The outlet from the vacuum generator 118 is connected to the inlet of vacuum block 116, and is thus in communication through passageways in block 116 to provide vacuum for suction cups 114.

Figure 6:
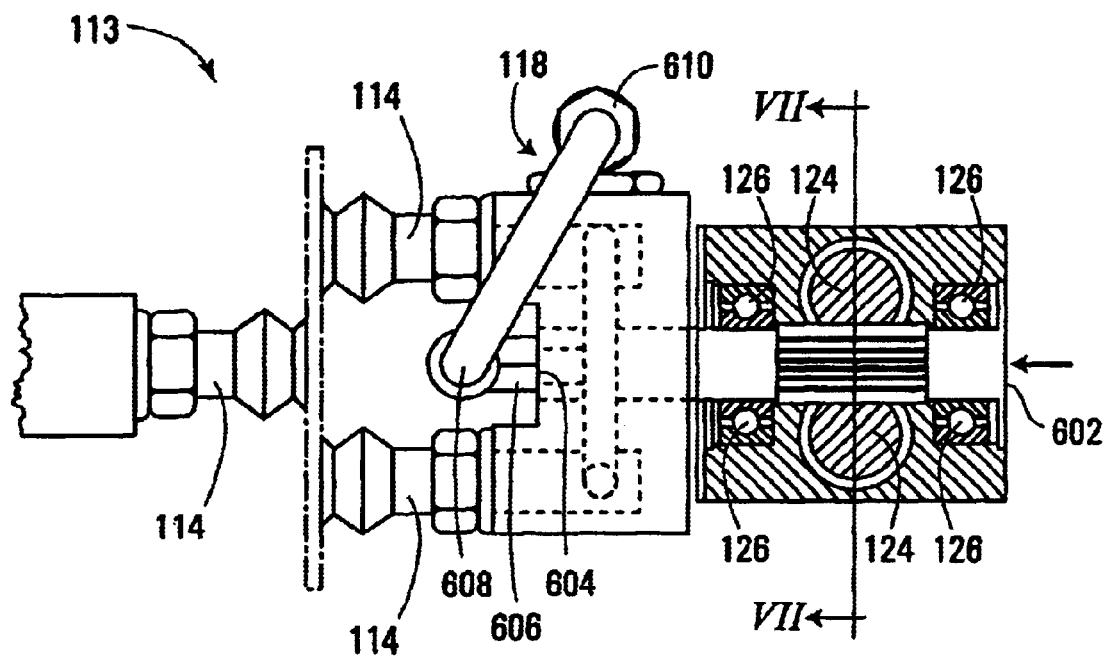
FIG. 6 is an enlarged view in the direction 6 in FIG. 5b of part of the orientation apparatus, shown partly in section.
Figure 7:
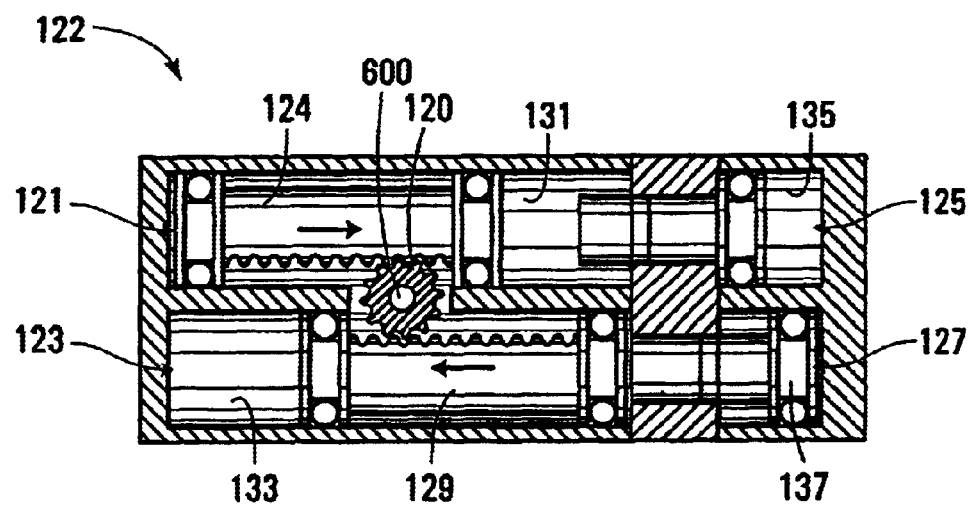
FIG. 7 is a cross sectional view at 7—7 in FIG. 6.

The pick apparatus or member 112 also includes a pinion shaft 120 for mounting and supporting suction head 113 (including the vacuum block 116, vacuum generator 118 and suction cups 114). Pinion shaft 120 is part of a 3-position actuator 122 that supports the vacuum block and other components. An example of a suitable actuator 122 is the model A032 made by Rotomation of Ormond Beach, Fla., illustrated in FIGS. 6 and 7. Pinion shaft 120 has a hollow longitudinal passageway 600 having an inlet 602 and outlet 604. Pressurized air flows from hose 186b to the inlet of passageway 600, through the passageway to the outlet 604. A fitting 606 connects outlet 604 to an inlet of a hose 608, which at its outlet is connected to vacuum generator 118. Thus, pressurized air can be delivered to the vacuum generator 118 for creation of a vacuum at suction cups 114. With reference to FIGS. 6 and 7, actuator 122 operates as a rack and pinion operated by air pressure in the preferred embodiment. Pinion shaft 120 is disposed between a pair of rack elements 124 and 129. Shaft 120 is also supported between ball bearings 126 so that when rack elements 124, 129 are activated, the rotation of shaft 120 is supported by the bearings 126. Pressurized air can be fed into cylinders through inlets 121, 123, 125 and 127. By pressurizing the cylinder 131 connected to inlet 121, rack 124 is moved to the right in FIG. 7 and thus shaft 120 can be rotated a full turn in the clockwise direction. Pressurizing cylinder 131 adjacent 121 will be facilitated by depressurizing the cylinder 133 adjacent inlet 123, as movement of shaft 120 in a clockwise direction will drive rack 129 to the left. This rotation of shaft 120 by a full turn rotates the suction head attached thereto by 180 degrees. If cylinder 133 is pressurized through inlet 123, and cylinder 131 permitted to be de-pressurized, the result is an opposite movement, 180 degrees backwards. Between the 180 degree limits of movement of suction head 113, is a home or middle position. The middle position of shaft 120 can be attained by pressurizing both additional cylinders 135 or 137 with equal pressure, and de-pressurizing cylinders 131 and 133. This will result in a half turn of shaft 120 by a relative half distance movement of racks 124 and 129. The middle position provides for the shaft to be 90 degrees from each of the limits of rotation and translates to the home position for the suction head 113.

Thus actuator 122 can rotate the suction head 113 about the axis of shaft 120 either plus or minus 90 degrees from the home position by selectively pressurizing and depressurizing the cylinders 131, 133, 135 and 137.

The following describes the mechanism by which positive pressurized air is delivered from a source to both operate the actuators 122 of the pick up members and to the vacuum generators 118, which are adapted to create vacuum at the suctions cups 114. A source of pressurized air is introduced into a longitudinally extending cavity 160 at a rotary joint (such as is manufactured by Pisco) located at the rear of the main shaft 60. Pressurized air is delivered along cavity 160 from the inlet to an outlet where it interconnects with a manifold 162 that is secured to the outer face of disc 66. From manifold 162 the pressurized air is diverted through to a double branch connector 164 (such as is also manufactured by Pisco). Hoses 163 then carry the pressurized air from the connector 164 to a distributor control valve 166 (there is a control valve associated with each planetary unit). An example of a suitable control valve 166 is a solenoid valve such as is manufactured by Festo Corporation under part number CPE14-M1H-L-1/8. Control valve 166 splits up the pressurized air into separate flows carried by individual hoses 165 which are housed within a protective tube 168 and controls the flow of pressurized air to the moon unit and pick up members.

Thus, hoses 165 each have an inlet connected to an outlet of control valve 166 and an outlet that is connected to a multi-ported rotary or swivel block connector 170 which is affixed at the rear end of planetary shaft 80. Also, providing air communication between the outlet ports of swivel connector 170 and the inlet of a longitudinally extending cavity 174 in planetary shaft 80, is a multi-circuit adapter 184a which feeds hoses 176 from the outlet ports of connector 170 to the inlet of cavity 174.

Hoses 176 pass along cavity 174 to an outlet 178, which is an aperture located proximate the front end of planetary shaft 80 between discs 90 and 92.

Hoses 176 then pass through planetary disk 90 into a protective tube 180 and pass to a second multi-ported swivel block connector 182. Thus air communication is provided between the outlet ports of swivel connector 170 and the inlet of swivel block connector 182 through longitudinally extending cavity 174 in planetary shaft 80, through an aperture in disc 90 and through protective tube 180 to the inlet of swivel connector 182.

Air can then be passed from connector 182 to a second multi-circuit adapter 184b into hoses 186 which feed into an inlet of a longitudinally extending cavity 188 in moon shaft 100. Hoses 186 pass along the length of cavity 188 of moon shaft 100 to an outlet. At the outlet of cavity 188 some of the hoses 186, in particular three of the hoses 186a, 186c and 186d feed into the actuator 122. As described above, the other of hoses 186, in particular 186b is used to supply pressurized air through pinion shaft 120, to vacuum generator 118. Hoses 186a and 186c each are connected to one of actuator inlets 121 and 123. Hose 186d actually divides into two hoses (not shown) at actuator 122, each of the hoses supplying one of inlets 125 and 127 with pressurized air at the same pressure.

Control valve 166 is connected to electric control wires (not shown). Control wires pass to an electrical slip ring 68 that is mounted on shaft 60. The slip ring permits the signals from PLC 199, to be sent to control valve 166. PLC 199 is able to monitor the position and speed of rotation of each of the planetary units and moon units (and thus pick up members) of the feeder. Accordingly, PLC 199 can control the activation of control valve 166 and thus control the passage of air to vacuum generator 118 and actuator 122. PLC 199 can selectively activate valve 166 so that actuator 122 will rotate suction head 113 or cause vacuum generator 118 to generate a vacuum at suction cups 114 at a specific desired rotational position. Further details of how this could be accomplished are described in U.S. Pat. No. 5,997,458.

As mentioned above, each of feeders 30a, 30b and 30c is generally constructed identically. However, in this preferred embodiment, at least one of feeders 30a or 30b have actuators 122 that permits suction heads 113 of each planetary unit to be rotated plus and minus 90 degrees from a home position, about an axis that is perpendicular to the moon axis, planetary axis and sun axis (ie. about a longitudinal axis). The remaining feeder or feeders do not need this capability in this embodiment.

Figure 4:
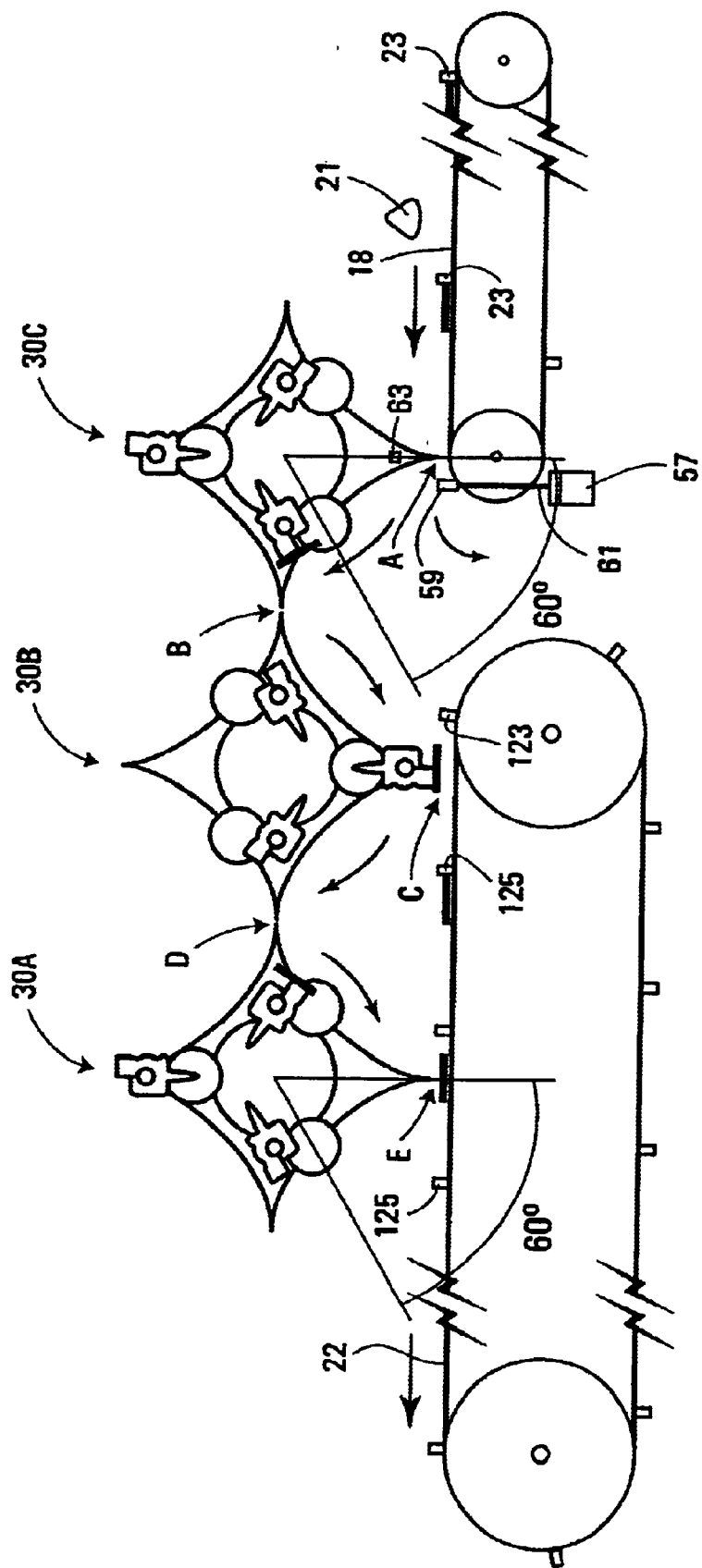
FIG. 4 is a reverse schematic side view of parts of the orientation apparatus of FIGS. 3a–3e.
Figure 4A:
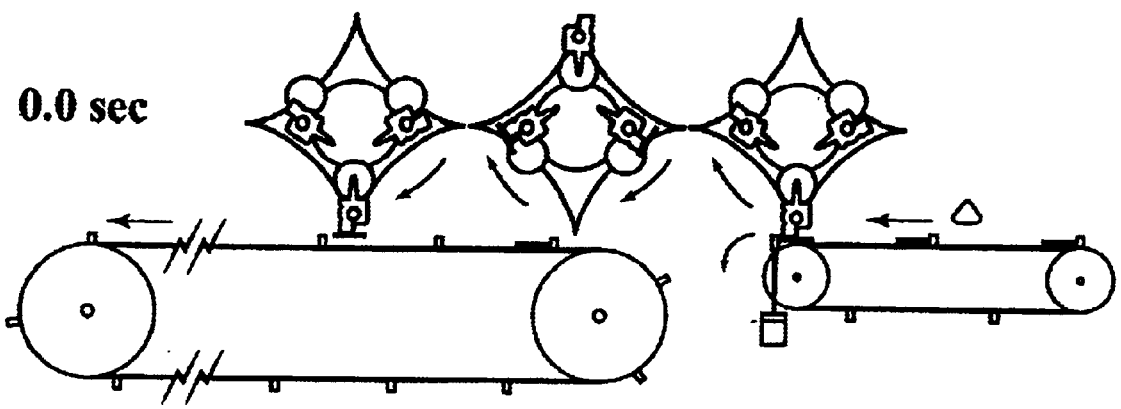
FIGS. 4A–4M are a timing chart showing the relative movement of the orientation apparatus of FIGS. 3a–3e over time.
Figure 4B:
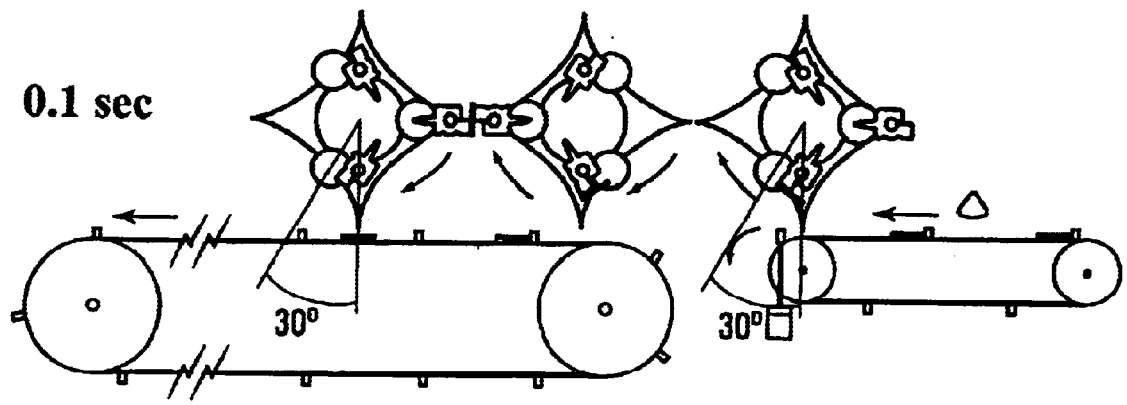
Figure 4C:
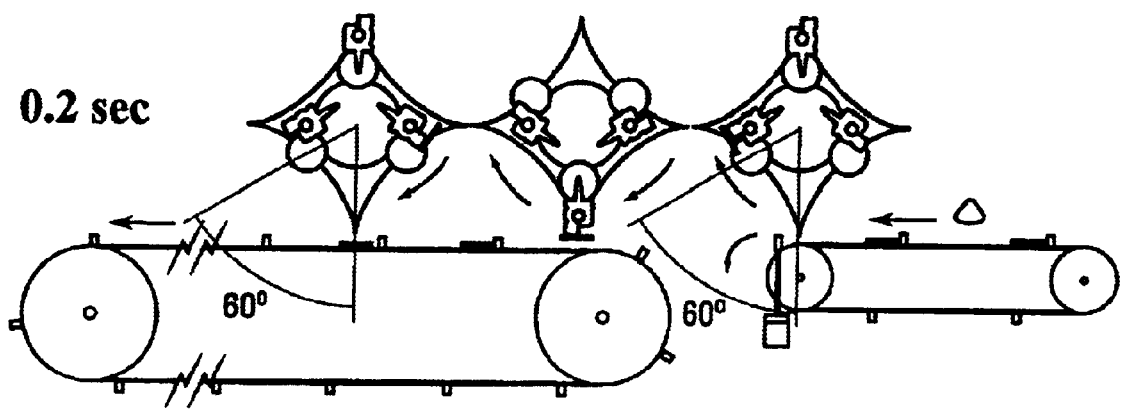
Figure 4D:
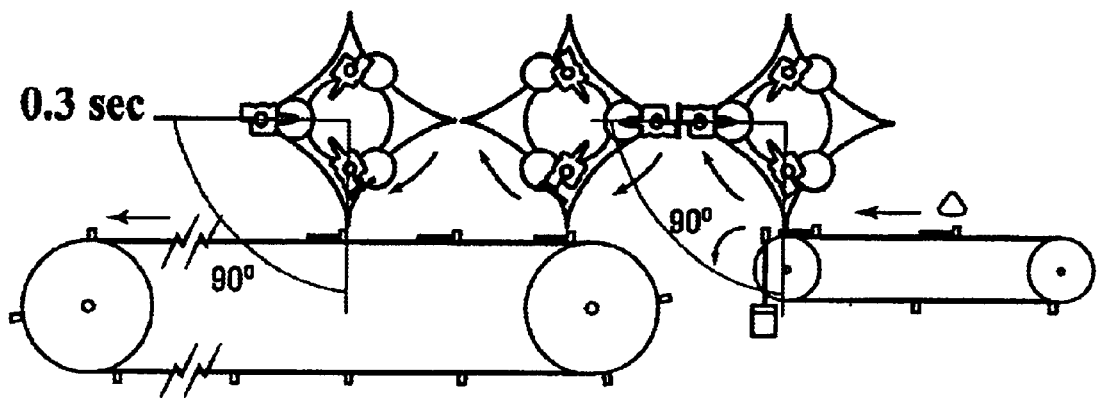
Figure 4E:
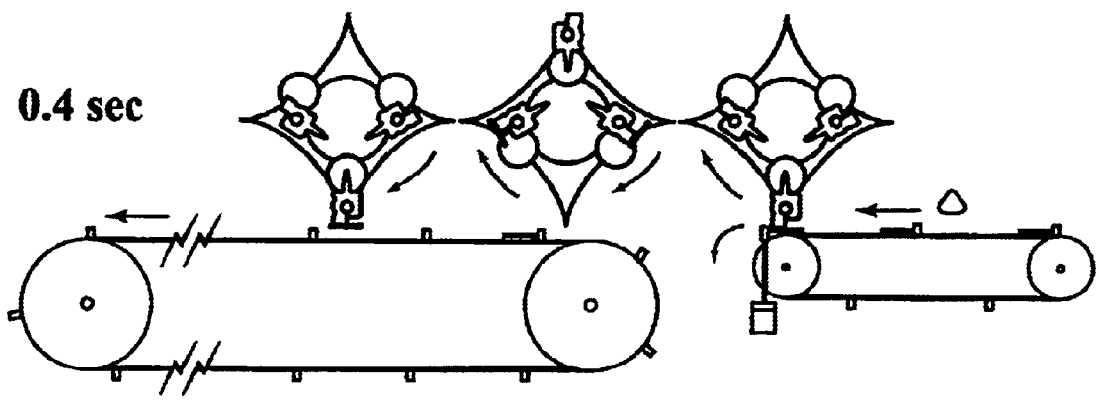
Figure 4F:
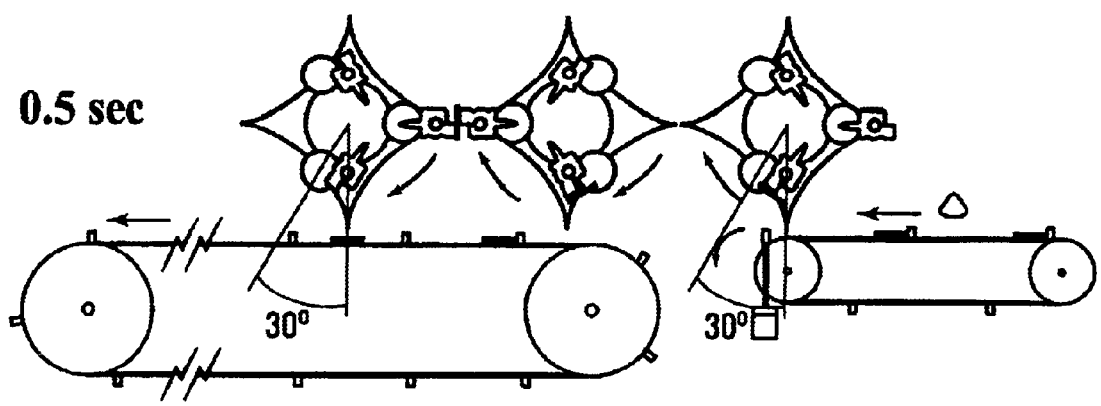
Figure 4G:
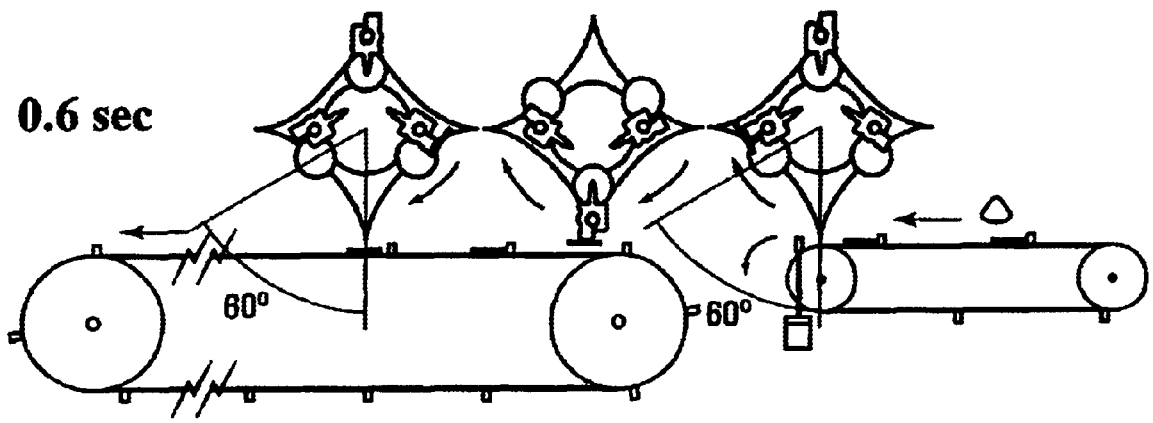
Figure 4H:
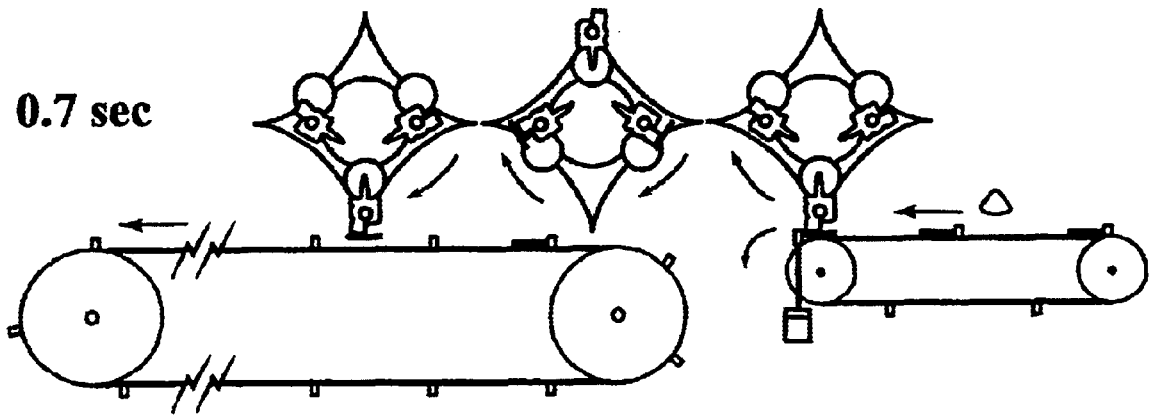
Figure 4I:
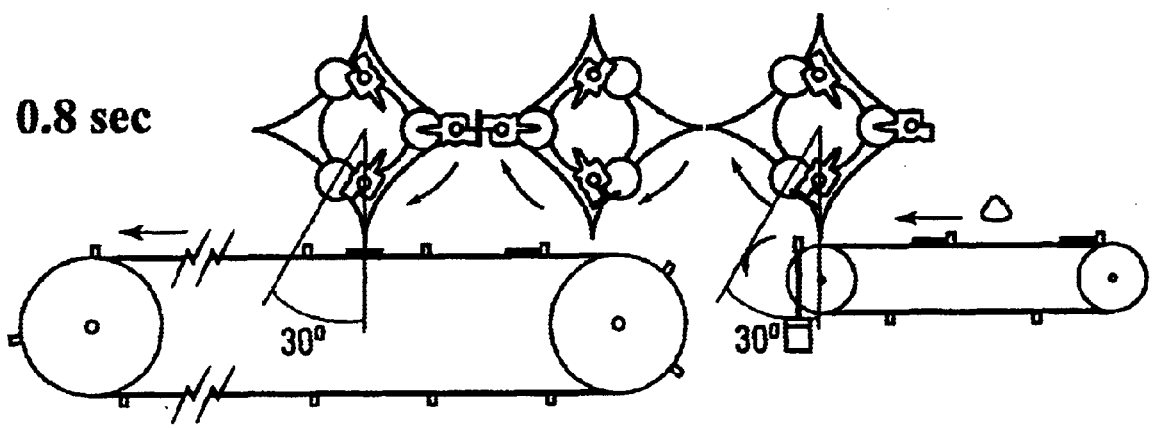
Figure 4J:
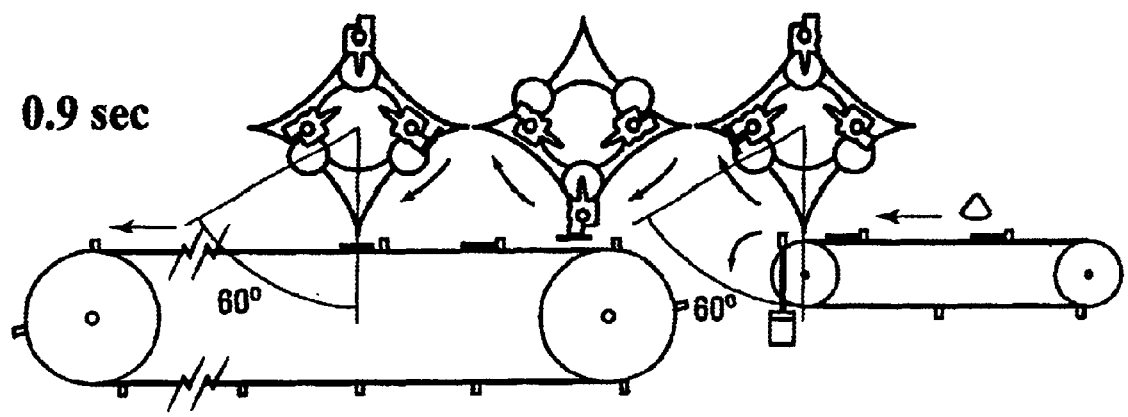
Figure 4K:
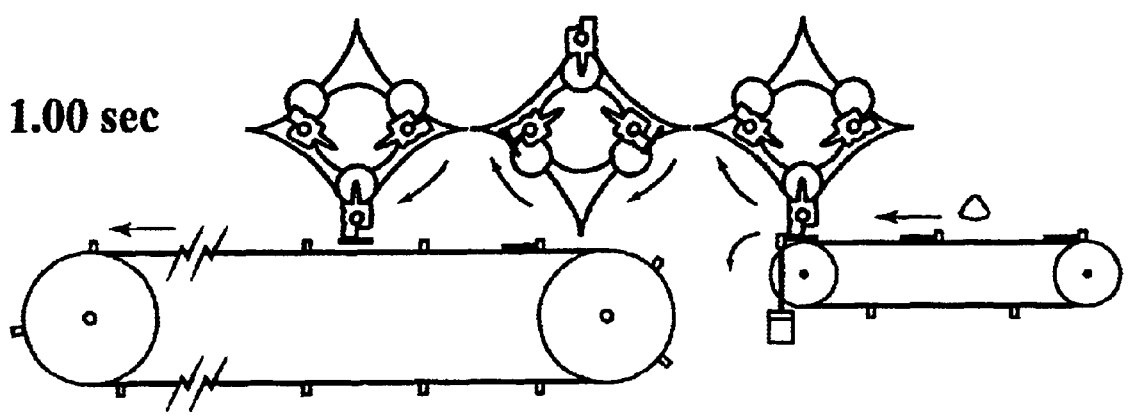
Figure 4L:
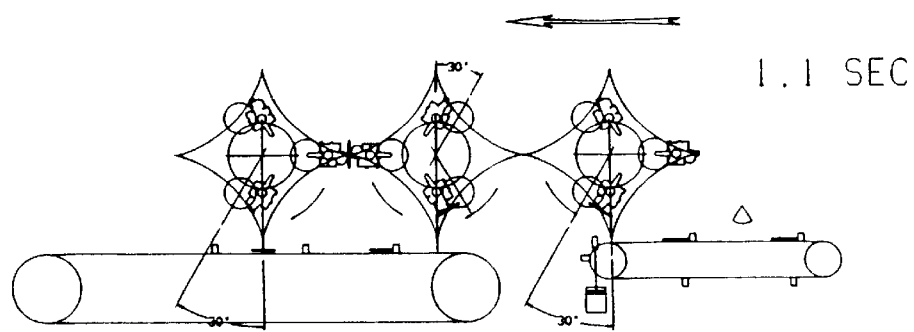
Figure 4M:
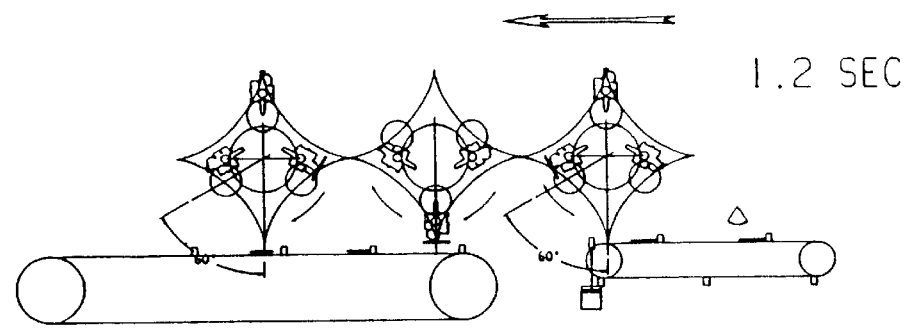

With reference to FIG. 4, each of feeders 30a, 30b and 30c are configured with gear ratios in such a manner that the angular rotation of each of the planetary units 34 w2, is four times the angular rotation of the carrier member 32 w1, in the opposite direction (ie. w2/w1=−4). The angular rotation of the moon member w3 is chosen to be equal in magnitude but opposite in direction to that of the planetary member (ie. w3=−w2). Furthermore, by using this type of rotary feeder, the tangential velocities of the pick up members can be reduced, particularly at certain points of the rotational cycle such as at the vertices of the rotational path. In the preferred embodiment, the relative position and configuration of the planetary members/units and moon members/units and other components are chosen so that the overall result is a path for each pick up member and in particular the pick up face of the suctions cups, is as illustrated in FIG. 4. In the paths illustrated in FIG. 4 each pick up member has a path with four vertices, the pick up member and suction cups remaining outward facing and at each of the vertices the tangential velocity at the face of the suction cups will be substantially equal to zero.

The overall configuration, design and operation of each of feeders 30a, 30b and 30c is very similar to that of the rotary object feeders disclosed in U.S. Pat. No. 5,910,078, issued Jun. 8, 1999, and U.S. Pat. No. 5,997,458 issued Dec. 7, 1999, and the contents of those patents are hereby incorporated by reference.

The operation of each feeder 30a, 30b and 30c is generally as follows. A source of rotational power drives main shaft 60 at a continuous angular velocity of ω1, which is controlled by PLC 199. Also, a source of pressurized air is supplied to main shaft cavity 160. The rotation of shaft 60 causes the carrier disk 66 to rotate with it, as disk 66 is fixed relative to shaft 60. The rotation of disk 66 in one rotational direction with an angular velocity ω1 will cause the idler gear 84 associated with each planetary unit 34 to be driven around sun gear 70, as sun gear 70 is fixed relative to the frame. This rotation causes each idler gear 84 to rotate about its shaft 85 in a direction that is the same as the direction of the rotation of disk 66 (as illustrated in FIG. 9). As each planetary gear 82 is engaged by its idler gear 84, planetary gear 82 is rotated about its planetary axis in the opposite direction as idler gear 84 and disk 66 at an angular velocity ω2. As planetary gear 82 is fixedly attached to the planetary shaft 80, each planetary shaft 80 and its corresponding planetary unit 34 as a whole, also rotate in the opposite direction to disk 66 about their planetary axis at an angular velocity ω2.

As each planetary unit 34 rotates about its respective planetary axis, its associated moon idler 106 is rotated as it moves around secondary planetary gear 95 (which is fixed relative to disc 66). Each moon idler 106 rotates in the same direction as the planetary unit 34. The rotation of each moon idler 106 causes rotation of its respective moon gear 104 in the opposite direction and at an angular velocity of ω3.

The result is that as disc 66 rotates at angular velocity ω1, each of the three planetary units rotates at an angular velocity ω2 (which is has a value of −4 ω1) and each moon unit and its associated pick up member 112 and related suction cups 114 in particular, will rotate at an angular velocity of ω3 (which has a value of −ω2). Overall, the pick up members of each moon unit on each planetary unit, will follow a path that is illustrated in FIG. 4.

As a result of the contribution of rotations of imparted to the pick up members as a result of the rotations of the disc 66 about the sun axis, the planetary unit around its planetary axis and the moon unit, the total cumulative rotations will result in a substantially zero tangential velocity being achieved at each of the four vertices of the path illustrated in FIG. 4. This zero tangential velocity is highly desirable, although it is still possible, within limits, to transfer pouches from one rotary feeder to the adjacent feeder, even if the velocities at the transfer point are not zero or substantially zero.

During the rotation of the rotary feeder 30, positive pressurized air is delivered through cavity 160 to control valve 166. From valve 166 pressurized air can be passed through hoses 165, to swivel connector 170 and into multi-circuit adapter 184a. During rotation, swivel connector 170 permits the shaft 80 to rotate relative to the hose 165 feeding the connector. From connector 170, the air is carried by hoses 176, which pass into cavity 174 of planetary shaft 80 and then exit at aperture 178. Hoses 176 then carry the pressurized air to second swivel connector 182, which permits moon shaft 100 to rotate relative to the hoses 176. From connector 182 the air passes by way of multi-circuit adapter 184b to hoses 186 which deliver air through shaft cavity 188 to actuator 122 and vacuum generator 118. It will appreciated that from valve 166 to the actuator 122 and vacuum generator 118, several separate, continuous pressurized air paths are provided so that the opening or closing of a path has an effect on a specific operation of actuator 122 or vacuum generator 118.

PLC 199 controls the activation of valves 166 to control the air pressure through the various hoses so that pressurized air is supplied at appropriate rotational positions to both the actuators 122 and to the vacuum generators 118. Vacuum generator 118 will convert the positive pressured air to a vacuum at the suction cups 114. The result is that by activation of the control valve 166, suction can be selectively supplied and released at each of the suction cups 114 of each of the pick up members 112. Also, actuators 122 can be selectively activated when required, to rotate a suction head 113 on one of feeders 30a or 30b.

Enhanced control features can be introduced in to the control of valves 166 and the monitoring of the rotational position of the pick up members. For example, control can be provided to activate the control valve before the pick up member reaches the position where suction is required.

PLC 199 can also monitor the specific position and rotational speed of the planetary units and their pick up members by interaction with means such as position sensors and flags, and electro-mechanical resolvers.

The implementation of such features mentioned above are disclosed in U.S. Pat. No. 5,997,458 issued Dec. 7, 1999 to Guttinger et al.

Figure 9A:
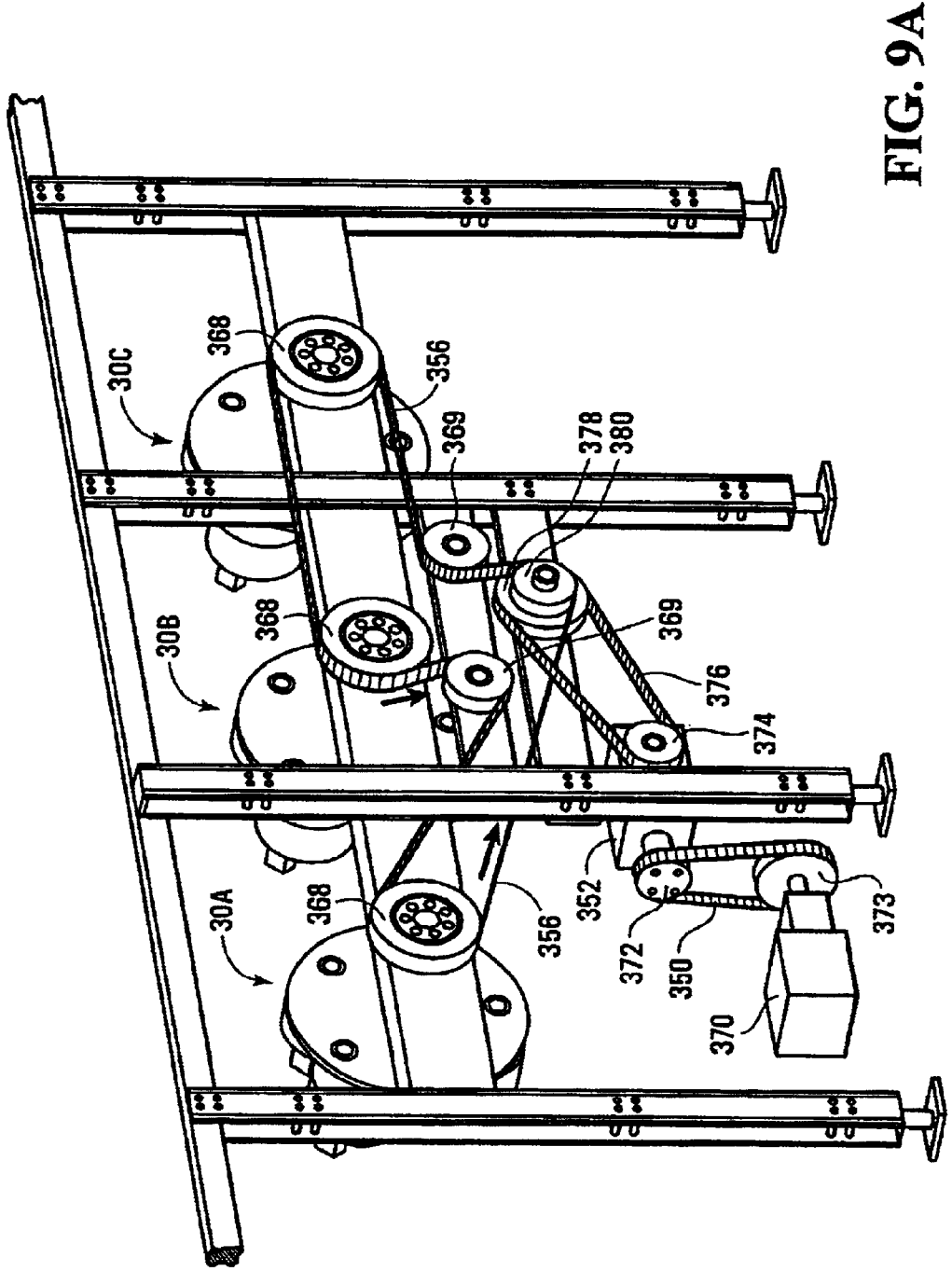
FIG. 9A is a sketch rear perspective view of the orientation apparatus of FIGS. 3A to 7.
Figure 9B:
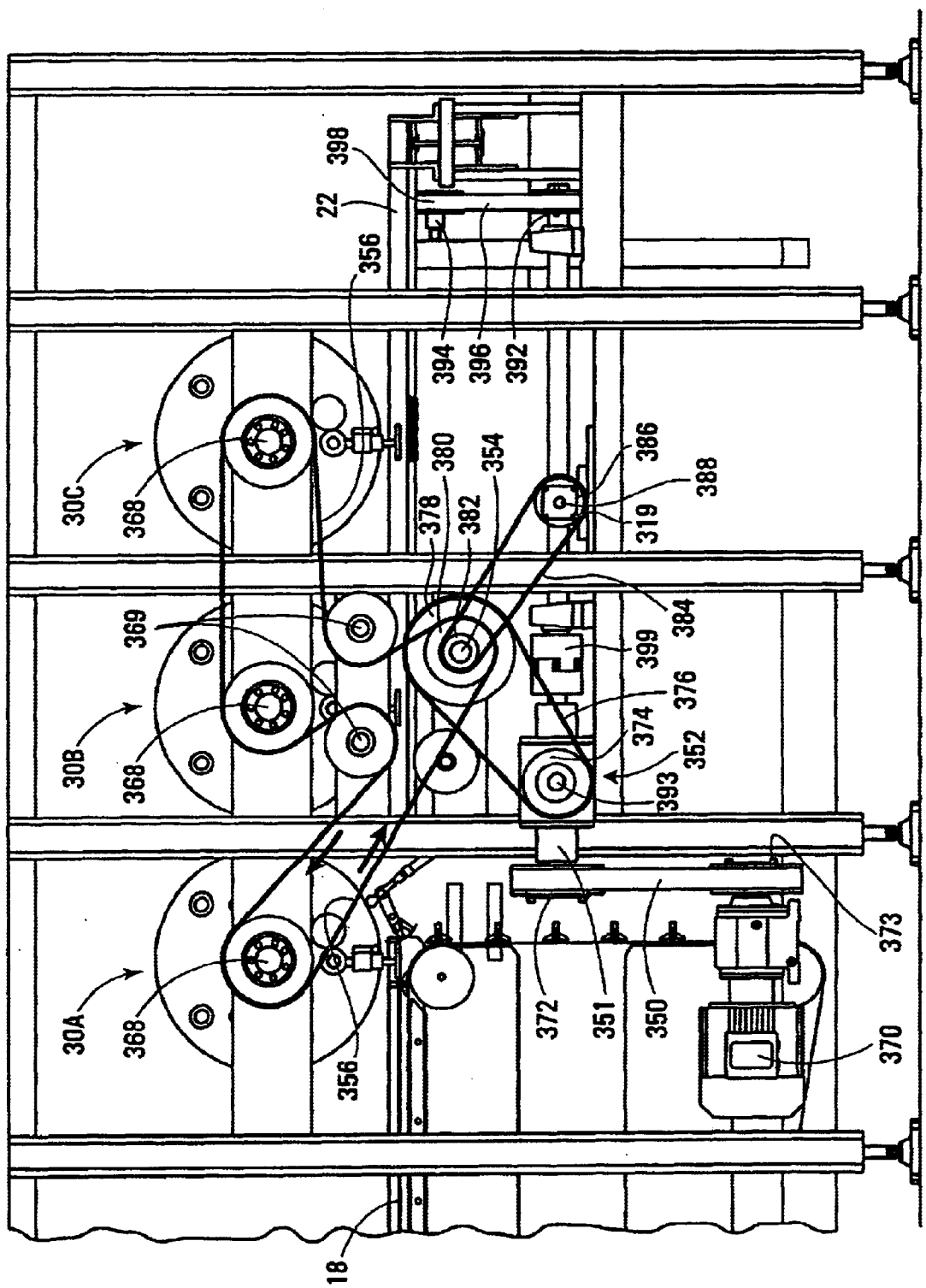
FIG. 9B is a schematic rear view of the orientation apparatus of FIGS. 3a to 7.

With reference to FIGS. 9A and 9B, the drive mechanism for each of the three feeders 30a, 30b and 30c includes a common drive motor 370 which drives a drive wheel 373 which rotates main drive belt 350 that in turn rotates drive wheel 372. Wheel 372 is fixedly attached to a shaft 351 of a miter gearbox 352. Gearbox 352 splits the rotation of wheel 372 and shaft 351 into two drive directions or shaft rotations, at 90 degrees to each other. Thus, gearbox 352 drives one shaft 393 to rotate drive pulley 374. Drive pulley 374 is interconnected by drive belt 376 to main drive wheel 378, which is mounted for rotation on a shaft 380. Mounted to the same shaft 380 on a different plane, for rotation with wheel 378, is feeder drive wheel 354. Secured to the rear of each main shaft 160 of feeders 30a, 30b and 30c is a drive wheel 368. Each of the drive wheels 368 is interconnected to and moves with the same feeder drive belt 356 which is driven by rotation of drive wheel 354 around drive wheels 368 and intermediate idler pulleys 369. The result is that all of shafts 160 of each of feeders 30a, 30b and 30c are interconnected and rotate together driven by belt 356 and wheels 368. Since wheels 368 are have the same diameter, one rotation of feeder 30a will also be accompanied by one rotation of the other two feeders 30b and 30c.

A secondary wheel 382 is also mounted at yet another plane about shaft 380 for rotation with drive wheel 378. Secondary drive wheel 382 drives belt 384, which in turn rotates drive wheel 386, which is mounted for rotation about a shaft 388. Rotation of wheel 386 will rotate shaft 388 to which is affixed a resolver 389.

Conveyor 22 is also driven by motor 370 through a series of belts and wheels interconnected to a second end shaft 376 of gearbox 352, oriented at 90 degrees to shaft 393. A shaft 376 is interconnected to a conveyor drive shaft 390 by a universal coupling 399. Affixed to the opposite end of conveyor drive shaft 390 to the end connected to coupling 399, is a drive wheel 392. Rotation of wheel 392 rotates drive belt 396, which in turn rotates drive wheel 398. Rotation of wheel 398 rotates its shaft 394, which in a known manner is interconnected to drive conveyor 22. Thus, conveyor 22 will also move with the rotation of feeders 30a, 30b and 30c.

The overall gearing is such that each feeder and the resolver 389 will make one full rotation for every three pouch pockets moving past one of the drop-off locations C or E (FIG. 4).

Resolver 389 is provided which in conjunction with a Programmable Limit Switch (PLS) 205 (FIG. 12) that is able to provide digital signal corresponding to the angular positions of each of the pick up members on each of the feeders 30a, 30b and 30c and the horizontal position of the pouch pockets on conveyor 22. The resolver 389 is mounted and configured as described above and in such a manner so that it will rotate once for every full rotation of a pick up member of a feeder. Since all feeders 30a, 30b and 30c rotate together, the movement of the resolver 389 reflects the movement of each of the feeders. The rotation of the resolver can then be converted by PLS 205 to a digital signal which provides PLC 199 with the angular position for each of the feeders. Likewise, the resolver will rotate once, for every three pouch pockets passing one of the drop off locations C or E. Thus, resolver cycles once for a three pocket cycle of conveyor 22. Thus the signal PLS 205 sends to PLC 199 is also representative of the horizontal positions the three pockets in a group, relative to a drop off point C or E. It should be noted that for every rotation of the rotary feeders, three pouches are handled and thus one cycle of conveyor 22 corresponds to three pockets passing by a reference point (such as drop off points C or E). As PLC 199 knows the angular positions of the feeders at any time, then PLC can activate the valves etc. to operate the vacuum and rotation features of each of the feeders.

Computer system 201 for system 10 is shown in overview in FIG. 12. PLC 199 is the controller primarily tasked with controlling the overall operation of system 10, including the delivery of pouches from conveyor 16 to linear servo conveyor 18, to the pouch orientation apparatus 20 and then to discharge conveyor 22, by controlling the operation of the components of the system as is reflected in FIG. 12.

Pouches 13, which have both a longitudinal axis and a transverse axis, are delivered from the pouch feeder 14 to conveyor 16 at a non-consistent pitch, oriented in one of four possible longitudinal orientations (ie. with the longitudinal axis aligned with the direction of movement on the conveyor 16). Conveyor 16 transports the pouches in series to a transfer location where pouches can be transferred to linear servo conveyor 18. As referenced above, if either of first set 206 or second set 208 of sensors detect a problem with the pouches (ie a pouch is too close to another pouch, or there are two pouches partially overlapping) they will be rejected by PLC 199 activating the blow off air nozzles. Once a pouch reaches the end of conveyor 16 it is detected by eye 23 which sends a signal directly to the servo controller 218 (and is monitored by PLC 199) which will move a pair of lugs into a position where a pouch pocket is provided between the lugs. The conveyor 16, will in continuing to move, dump the pouch onto the L-shaped channel members which have base portions positioned slightly below the level of the pouch on conveyor 16. Pouch 13 will thus be propelled forward and assisted by guide wires 230 will be directed downward toward the base of channel members 220, 222 and will abut against the leading lug 25. This latter action will tend to stop the pouch's forward movement. As the pouch 13 settles or starts to settle it will then be engaged by a trailing lug as the linear servo conveyor 218 indexes forward to expose the next pocket for the next pouch. In turn, the lugs from servo pack trains from both the two independently operating conveyor belts of conveyor 18, and will each engage a series of pouches from conveyor 16 as the pouches are pushed onto conveyor 18. Pouches 13 are thus transferred on to each servo pack train of conveyor 18, each pouch 13 in each servo pack train resting in a lug pocket in front of a lug 25. Once a servo pack train is filled with for example five pouches (between each of the six lugs), each pouch sitting in a lug pocket and being pushed from behind by a lug 25, the train is quickly accelerated by the belt associated therewith, to the pick up location "A".

As the pouches 13 move on conveyor 18, the controller 218 associated with linear servo conveyor 18 will send a pulse signal to the vision system controller 219 as each pouch in the servo pack train is moved directly under camera lens 21. The vision system controller 219 will then almost instantaneously initiate the strobe light so that the pouch is illuminated in the camera lens to provide a frozen image of the pouch. The strobe light is designed to eliminate reflective light on shiny surfaces and so not distort the image viewed by the lens 21. It is that frozen image of each pouch which is processed by the machine vision system to determine which of the four possible orientations the pouch is in. Also, additional functionality can be provided for vision system 19 so that it can determine whether the pouch is suitable for processing or should be rejected.

The camera is mounted above the light so that the lens looks down from above through the light onto the pouches, and this camera/light assembly is positioned in the preferred embodiment approximately 2–4 inches away from the top surface of the pouch. When illuminated, an image is created which is sent to the image processor in the SmartImage Sensor device.

In the preferred embodiment, the processing of the image to determine suitability and orientation can be accomplished in the following manner. The SmartImage sensor can be set to have three or more separate 'soft sensors' as defined by DVT in product literature. Each soft sensor is directed to a specific visual task such as recognize the presence of certain marks such as a logo, word, etc. In the context of pouches which are tea bags, a first soft sensor 1 can be taught or programmed to recognize the presence of the a word such as "TEA" in a specific location on the pouch on one side of the bags. The other two soft sensors 2 and 3 could be taught or programmed to look for features that are registration marks on the opposite side of the bag. The result is that sensor 1 will provide an output of 1 if TEA is present and 0 if it is not present. If either sensor 2 or 3 detects a registration mark system 19 knows that the bag has its second side surface up (i.e. TEA side down). Depending upon which sensor 2 or 3 detects the registration mark, then system 19 know which longitudinal orientation the bag is in.

If, however, neither sensor 2 or 3 detects a registration mark, then system 19 knows the bag is oriented with the surface bearing the word TEA facing upwards. Which longitudinal orientation the bag is determined by whether or not sensor 1 detects the word TEA or not. There are of course many other ways in which the vision system 19 could be utilized to detect the orientation of a pouch.

In general, by each soft sensor providing a pass or fail result, the specific combination of passes and fails is linked to a specific orientation. The result is that by use of the three soft sensors, which of the four possible orientations the bag/pouch is in, can be determined.

The machine vision system 19 will then through vision system controller 219, provide four outputs [FRONT 1, FRONT 2, BACK 1, BACK 2] to PLC 199 which together provide an indication of the orientation. PLC 199 stores these outputs. If the pouch is unsuitable, the controller will not provide any of the four outputs with a positive indication. Additionally, when machine vision system 19 and controller 219 provide the foregoing previous outputs, they also provides a further output which serves to signal PLC 199 to go ahead and examine or obtain the four orientation outputs at that time instant.

Additional soft sensors can be programmed to determine whether the pouch is acceptable for further processing or should be rejected. For example, a pouch that is not properly aligned could be detected by one of more soft sensors being programmed to identify if either the word TEA appears a proper orientation. Soft sensors could also be programmed to recognize an acceptable shape for a pouch, unacceptable joints or seals formed, or even look for indicia to determine if the pouch is the right type (eg. wrong flavour of tea bag pouch).

The time that elapses when a bag/pouch enters and leaves field of view of the lens is greater than the total time required for the camera to take an image of that pouch with its camera lens 21, process the image and then send the appropriate outputs to the controller 219, and send those outputs to the PLC 199. Thus, there is sufficient time for the system 19 and controller 219 to take and process the image of one bag, before the next bag/pouch arrives for processing.

Vision system 19 can communicate to PLC 199 the orientation data relating to which of the four possible longitudinal orientations each pouch is in and/or suitability data, which is stored in a shift register in PLC 199. The shift register will be emptied once each pouch is processed at location A (either being picked up by orientation apparatus 20 or being rejected).

Each specific pouch that has already been identified by vision machine 19 and PLC 199, is moved to location "A", by conveyor 18 where it is met by a pick up member 112 of one of the planetary units (for example, the pick up member of unit designated "1" in FIGS. 3a–3e) of the first feeder 30a in the series of feeders. The movement of each pouch on conveyor 18, which is driven by servo motors, is adjusted as necessary so that the pouch will be in position at location A at the time that pick up member of one of the planetary units is also at location A. Thus, the movement of conveyor 18 proximate location A may be intermittent, as each pouch in a servo pack train is sequentially unloaded.

With reference again to FIGS. 4, 4A–M, 5a and 5b and also to FIGS. 3a to 3d, the synchronization of movement of the pick up members on each of feeders 30a, 30b and 30c, and the transfer of a pouch 13 therebetween, is now described in detail.

In overview, PLC 199, in communication with vision machine 19, (FIG. 12) identifies each pouch 13 that is delivered to the orientation apparatus and knows its initial orientation. Based on that information, PLC 199 is programmed to have the orientation apparatus 20 perform one of four operational sequences, if the pouch is accepted for processing. Also, PLC 199 will know if each pouch is acceptable for processing or if the pouch 13 should be rejected and diverted for possible recycling.

It should be noted that a pick up member of feeder 30a may reach location A and a pouch may not be there for pick up. This poses no problem for the operation of the system 10, as it is not necessary that on each rotation, each pick up member of each planetary unit pick up a pouch for re-orientation.

Each of the three feeders 30a, 30b and 30c have their carrier members 32a, 32b and 32c as well as their respective planetary members and moon members that include the pick up members 112 with suction cups 114, move with the same, constant, respective angular speed of rotations. At position A, if the pouch is not rejected, a pouch 13, is picked up by the suction cups 114a of the first planetary unit (in this case planetary unit 1), which moves to location A. The suction cups of pick up members 112 will typically be activated by PLC 199 prior to actually reaching location A (Note: they can be activated whether or not there will be a pouch 13 ready for pick up).

Figure 3A:
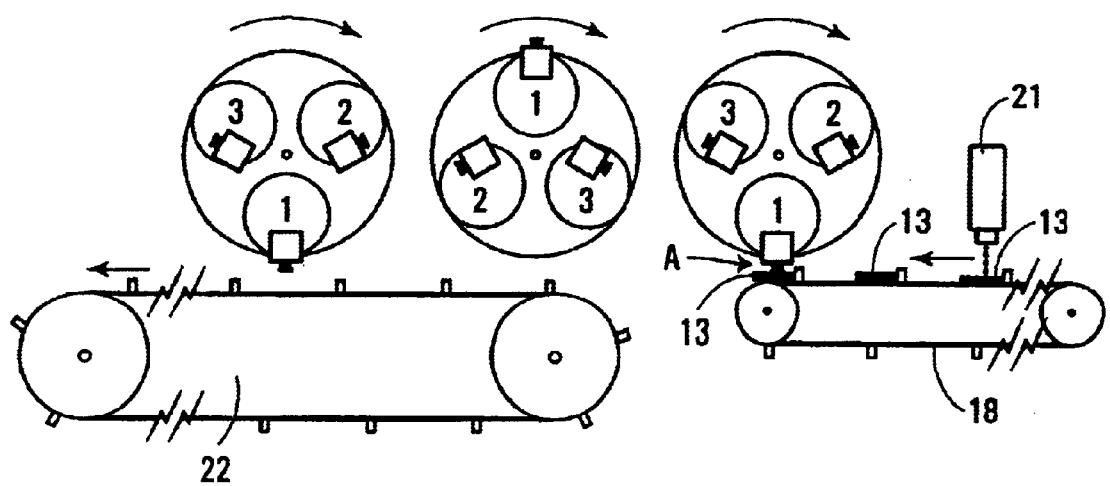
FIGS. 3a–3e are schematic side views of the orientation apparatus at different stages of operation, and which is part of the system of FIGS. 1 and 2.
Figure 3B:
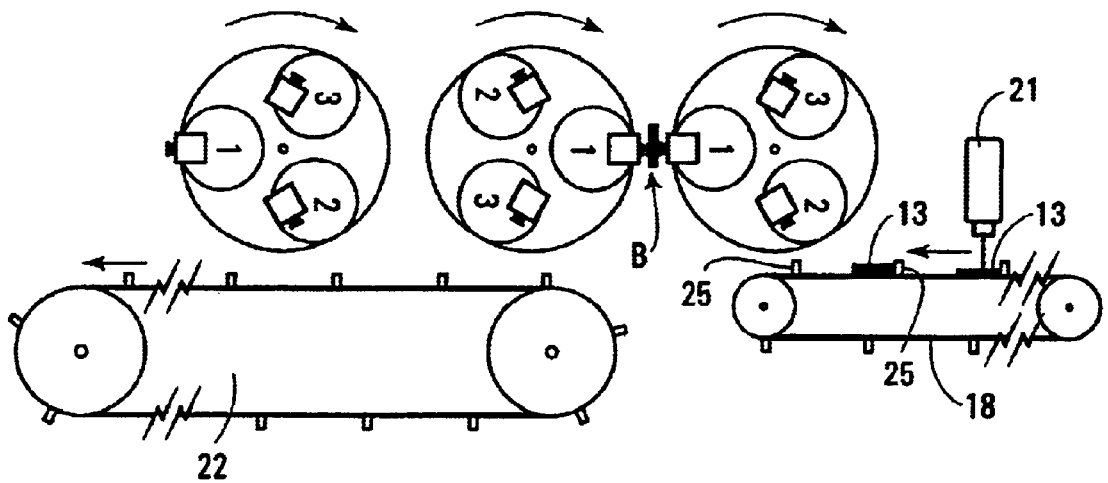
Figure 10A:
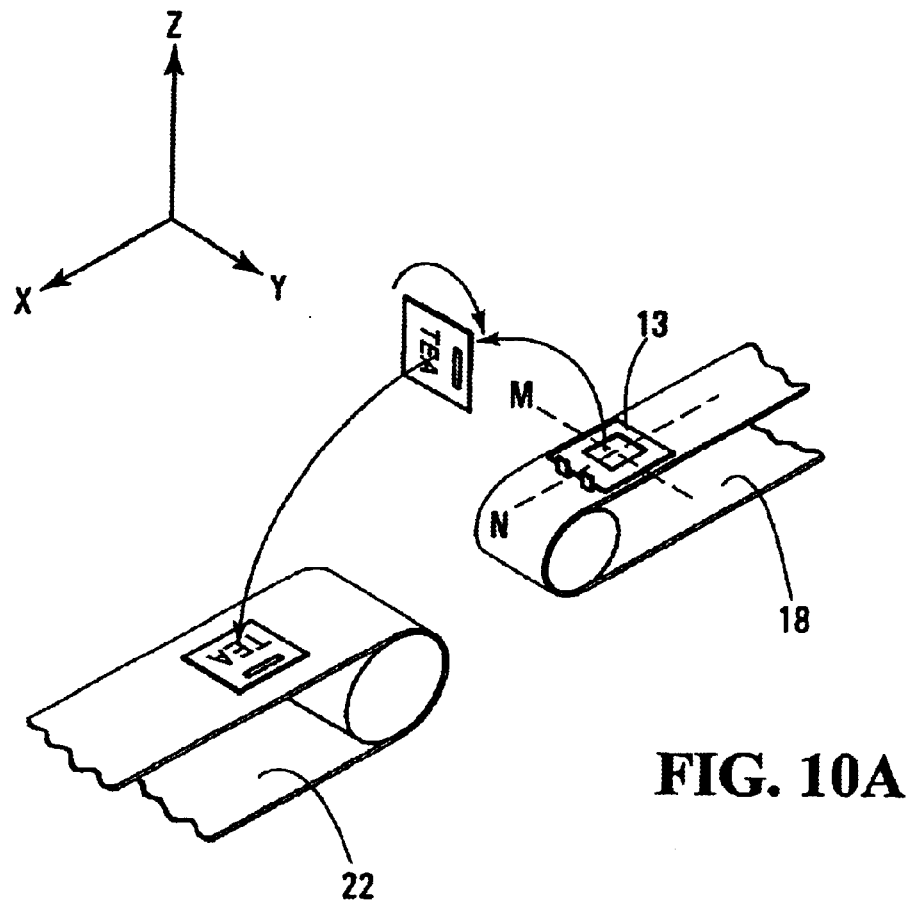
FIGS. 10a to 10d are schematic views showing how tea pouches delivered to the orientation apparatus in each of four different orientations are moved by the orientation apparatus such that all have the same orientation after handling.

The pick up member 112, carrying the pouch 13 will then be rotated so that the longitudinal axis of the pouch is rotated plus 90 degrees longitudinally about a transverse axis of the system (eg. axis y in FIG. 10a, so that the pouch is in position B shown in FIG. 3b. In addition to the rotation longitudinally about a transverse axis of the system, the longitudinal axis of the pouch 13 is also rotated either plus or minus 90 degrees transversely about a longitudinal axis of the system (eg. axis x in FIG. 10a) during the movement of the pick up member 112 from position A to position B, by operation of actuator 122 associated with that pick up member. Whether the pouches longitudinal axis is rotated plus or minus 90 degrees transversely about a longitudinal axis of the system is determined by the initial orientation of the pouch (which is known by PLC 199) and the operational sequence required to place the pouch in the pre-selected orientation and the operational sequence that flows therefrom. Thus, there will have been rotations of the longitudinal axis of the pouch, and the pouch itself, in two different directions as the pick up member 112 of feeder 30a that is carrying the pouch moves from position A to position B.

Alternatively, if the pouch 13 is to be rejected, then when the pick up member 112 of planetary unit 1 reaches location A, the suction cups will not be activated by PLC 199 and a pouch 13 will not be picked up. Instead pouch 13 will continue on conveyor 18, to the diverter as a rejected pouch.

For the pouches that are not rejected but are picked up at position A and rotated to position B, at the position B, as shown in FIG. 3b, the pick up member 112 of planetary unit 1 of feeder 30a is met by an opposed facing pick up member of planetary unit 1 of feeder 30b. Feeders 30a and 30b are positioned adjacent one another, such that one of the vertices of the path of the pick up members of one feeder 30a is proximate one of the vertices of the path of the pick up members of the adjacent feeder 30b. The common location B, at one of the vertices of each of the paths of the pick up members 112, is where both pick up members have substantially zero tangential velocity. Either at, or preferably a short angular distance before, point B, the vacuum at the suction cups of pick up member 112 on feeder 30a is deactivated. The suction cups 114 on feeder 30b will have been activated a short time prior to their arrival at the position B shown in 30b. Thus, when both pick up members reach location B at the same time, the pouch 13 will be released from the pick up member of feeder 30a and transferred to the pick up member 112 of feeder 30b.

It is possible, to impart a positive pressure through the suction cups to release the vacuum at a transfer or drop off point to ensure that the suction is released from the suction cups 114 to ensure a proper transfer, although simply turning off the vacuum generated by the vacuum generators will achieve the desired result.

Figure 3C:
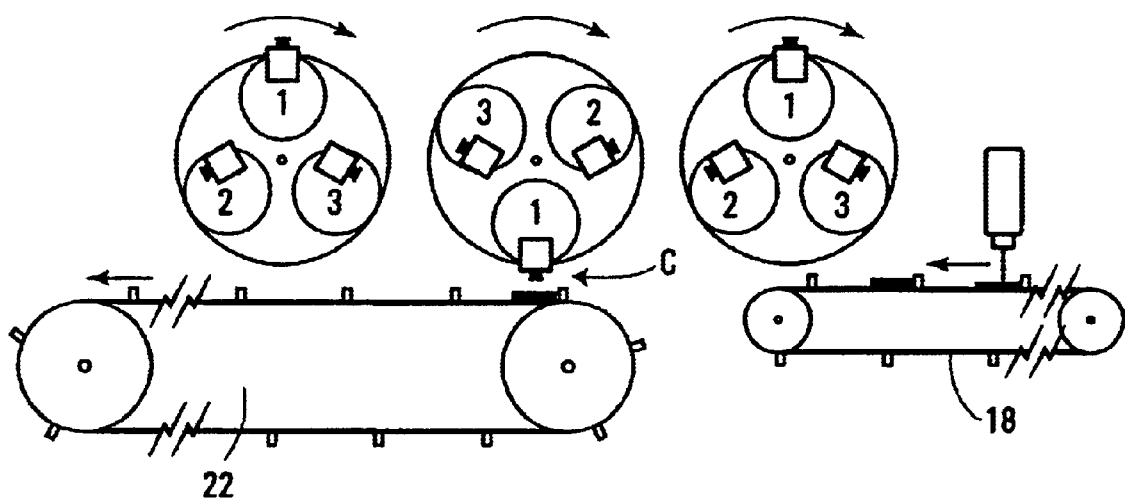
Figure 3D:
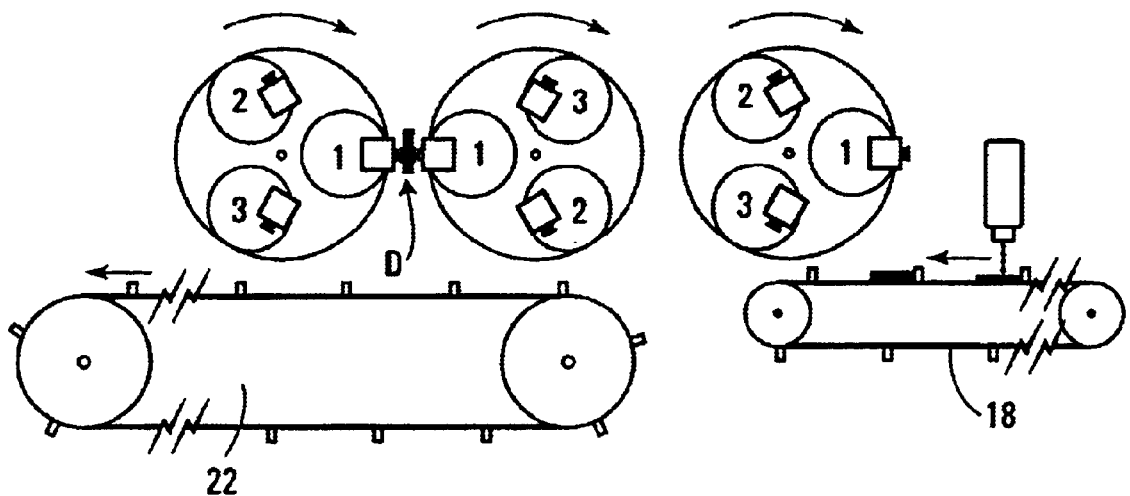

Thereafter, feeder 30b will rotate the pick up member 112 of feeder 30b, carrying the pouch 13, so that the pick up member is then in a position C shown in FIG. 3c, thus rotating the transverse axis of the pouch (which is now aligned longitudinally) about a transverse axis an additional 90 degrees. At the position C shown in FIG. 3c, if the pouch 13 is already in its desired orientation relative to conveyor 22, PLC 199 will deactivate its suction cups 114 and allow the pouch to be dropped onto discharge conveyor 22.

If, however, a further reorientation is required in order to put the pouch in its pre-selected or desired position on conveyor 22, the pouch will not be released when the feeder 30b has rotated its pick up member to position C. Rather, feeder 30b will continue rotating to move the pick up member of planetary unit 1 to the position D shown in FIG. 3d and in doing so rotates the transverse axis of the pouch (which is still oriented longitudinally) plus 90 degrees about a transverse axis of the system. Feeders 30b and 30c are also positioned adjacent each other in the same way that feeders 30a and 30b are positioned adjacent to each other as described above. Also, the movement of the feeders as a whole and their pick up members in particular are synchronized so that both pick up members of feeders 30b and 30c reach location D at the same time. At location D, PLC 199 will de-activate the suction cups of feeder 30b and activate the suction cups of feeder 30c, in a manner like that described above. Thus, the pick up member of feeder 30b releases the pouch to the suction cups of a pick up member on planetary unit 1 of feeder 30c. The transfer of the pouch 13 from feeder 30b to feeder 30c takes place at one of the vertices of paths of the pick up members of feeders 30b and 30c. At that position, the tangential velocity of the pick up members of both feeders 30b and 30c is equal to or substantially equal to zero, thus permitting a relatively smooth, easy transfer of pouch 13 from feeder 30b to feeder 30c.

Figure 3E:
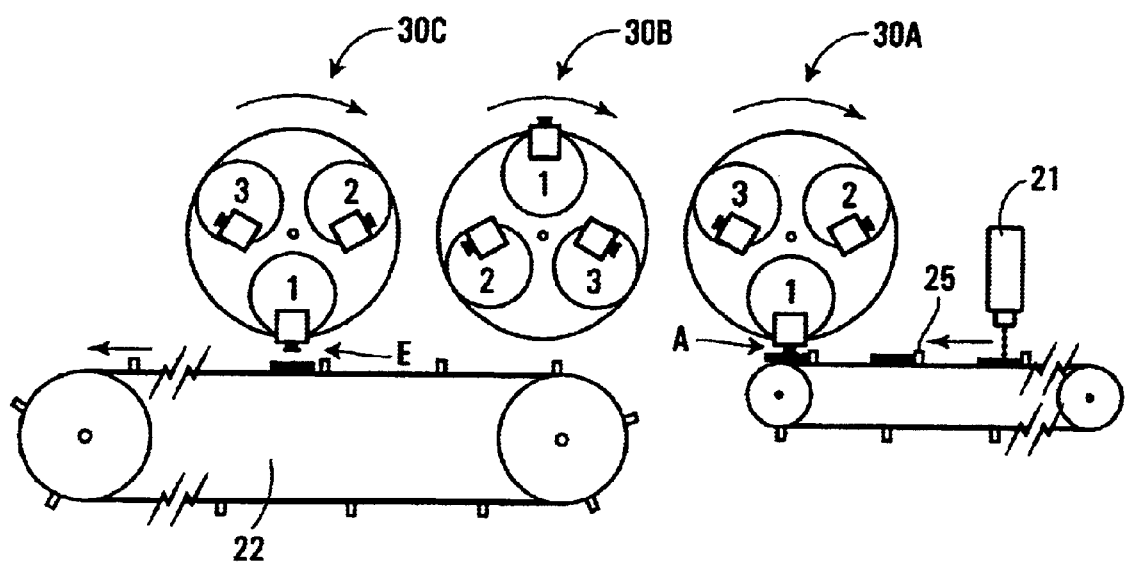

Thereafter, the feeder 30c will rotate the pick up member on feeder 30c to the position E shown in FIG. 3e. At that position, the suction cups 114 of feeder 30c will be deactivated by PLC 199 and the pouch will be dropped onto conveyor 22 in the desired orientation in front of a lug which then helps in moving the pouch along with conveyor 22.

The foregoing movement will take place with each of the three pick up members of each of the planetary units 1, 2 and 3 of each of the feeders 30a, 30b and 30c. The pick up member of planetary unit 1 on feeder 30a co-operates and is synchronized with the pick up member of planetary unit 1 of feeder 30b. Planetary unit 1 of feeder 30b co-operates and is synchronized with the pick up member planetary unit 1 of feeder 30c. Likewise pick up members on each of planetary members 2 and 3 of feeders 30a, 30b and 30c each co-operate and are synchronized in the same manner.

It is to be noted that generally the movement of the components of system 10, including feeder 14, conveyors 16, 18 and 22, and feeders 30a, 30b and 30c is continuous so that a relatively greater speed of pouch processing is possible than with a system that has several components that move in an intermittent manner. The intermittent movement of linear servo conveyor 18 during loading and unloading is such that the overall speed of the system in not significantly impacted.

It is not necessary that when pouches 13 are placed on conveyor 22, that all of the lugs carry or push a pouch 13. If there are any pouches missing (ie. a pouch is not delivered to every space on conveyor 22 in front of a lug), the system 10 can accommodate the same by providing a product accumulator device at the end of conveyor 22, which are known in the art. Using an accumulator, pouches can be accumulated prior to loading into a box. An example of the general functionality required of a suitable accumulator is disclosed in U.S. Pat. No. 4,168,776 dated Sep. 25, 1979 and U.S. Pat. No. 5,018,334 dated May 28, 1991.

The relative speeds of operation are such that conveyor 22 and rotary feeders 30a–c are all running at a speed such that pick up members 112 of feeder 30a are rotating through position A with a frequency that is at least the same or greater, than the frequency of pouches 13 arriving on conveyor 18 at location A. The overall result in system 10 is that at certain positions on conveyor 22, a pouch may not be provided for each lug. The movement of the feeders and conveyor 22 is such that if a first pouch is deposited onto conveyor 22 at position C by planetary unit 1 of feeder 30b, as shown in FIG. 3c, conveyor 22 will have moved that first pouch clear downstream of position E by the time planetary unit 2 of feeder 30b has picked up a pouch and passed it planetary unit 2 of feeder 30c, and deposited that second pouch on conveyor 22 at position E. Indeed, the speed of conveyor 22 is such that if a pouch 13 is not deposited into a particular lug pocket provided in front of a lug 125 on conveyor 22 at location C, but is transferred from feeder 30b to feeder 30c for transfer to conveyor 22 at location E, the movement of the lug pocket on conveyor 22 will follow the horizontal movement of the pouch as it moves from location C to location E. The actual pouch movement in a horizontal direction will actually vary as it moves from location C to D to E, but when it reaches location E, the same pocket on conveyor 22 that was positioned proximate position C to receive the pouch, will have moved proximate position D, and can then receive the pouch at that position. Thus, there is no difficulty with two pouches being deposited in the same space on conveyor 22.

FIGS. 10a to 10d show changes in orientations that can be effected on a pouch 13 by use of the rotary feeders 30a, 30b and 30c. Each pouch arrives on conveyor 18 and its longitudinal axis is aligned in the direction of motion along conveyor 18 such that its longitudinal axis is parallel to axis x. There are four possible orientations that which a pouch 13 can be delivered, since a pouch 13 can only rest on one of its two substantially flat sides and not on either of its two edges. It would, of course, be possible to adapt this machine to handle other types of containers such as boxes, which could also arrive on one of their sides in one of two different longitudinal directions (thus adding another four possibilities of orientation).

In the embodiment disclosed, however, a pouch is in one of the four possible longitudinal orientations the pouch (eg. teabag) when delivered to the first feeder 30a by conveyor 18. The combination of feeders 30a, 30b and 30c can each take and reorient the pouch so that it is moved to a pre-selected, common transverse orientation wherein the longitudinal axis has been rotated 90°, so that the pouch is oriented transversely on conveyor 22 in the correct direction, and is also with the desired face or surface facing upwards.

Thus, when a pouch 13 is delivered in orientation as depicted in FIG. 10a by conveyor 18, it is only necessary for feeder 30a to deliver the pouch to 30b and at the same time rotate the longitudinal axis plus 90° in a transverse direction. In other words, feeder 30a will rotate the longitudinal axis of the pouch (axis N) 90° about a transverse axis (an axis y) which is parallel to the sun axis, planetary axis and moon axis and plus 90° transversely about a longitudinal axis (such as an axis x). Feeder 30b then has a pouch with the transverse axis (axis M) of the pouch now aligned longitudinally (in the direction of axis x). The pouch is then rotated by the feeder 30b so that the transverse axis M of the pouch is rotated plus 90 degrees about a transverse axis (axis y). The result is that when deposited onto conveyor 22, the pouch is in the orientation shown.

Figure 10B:
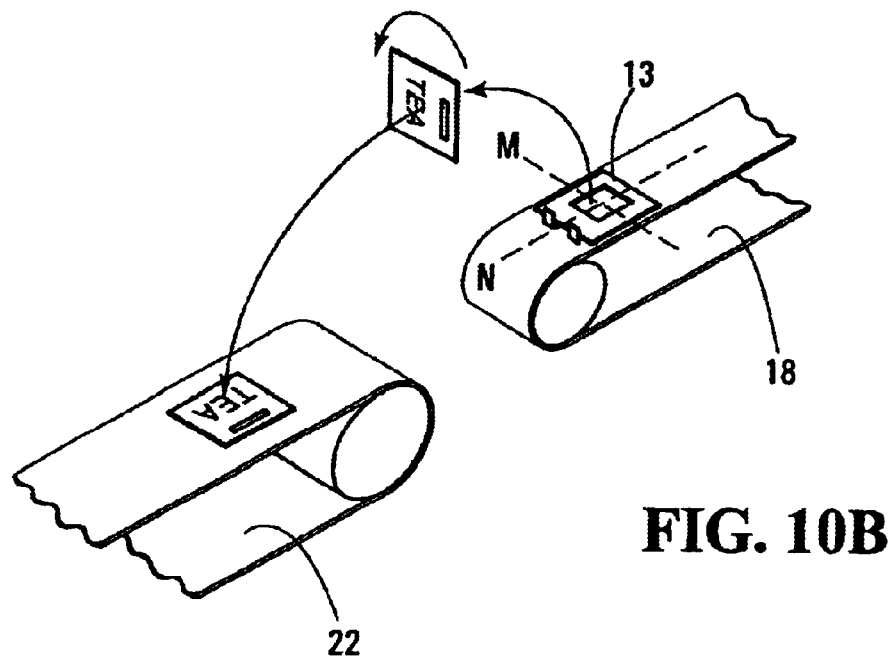

With reference to FIG. 10b, the pouch is delivered in such a manner that again the longitudinal axis of the pouch N is rotated plus 90° about a transverse axis (axis y) but is also rotated minus 90° about a longitudinal axis (axis x) by the first feeder 30a. Then the second feeder 30b rotates the transverse axis M of the pouch (which is oriented longitudinally) plus 90 degrees about a transverse axis Y.

The resulting orientation of the pouch when placed on conveyor 22 is the same as effected in the FIG. 10a sequence of operations.

With respect to both FIGS. 10a and 10b, the pouch is delivered in an orientation such that all operations needed to put the pouch in the desired transverse orientation can be accomplished by only rotary feeders 30a and 30b.

Figure 10C:
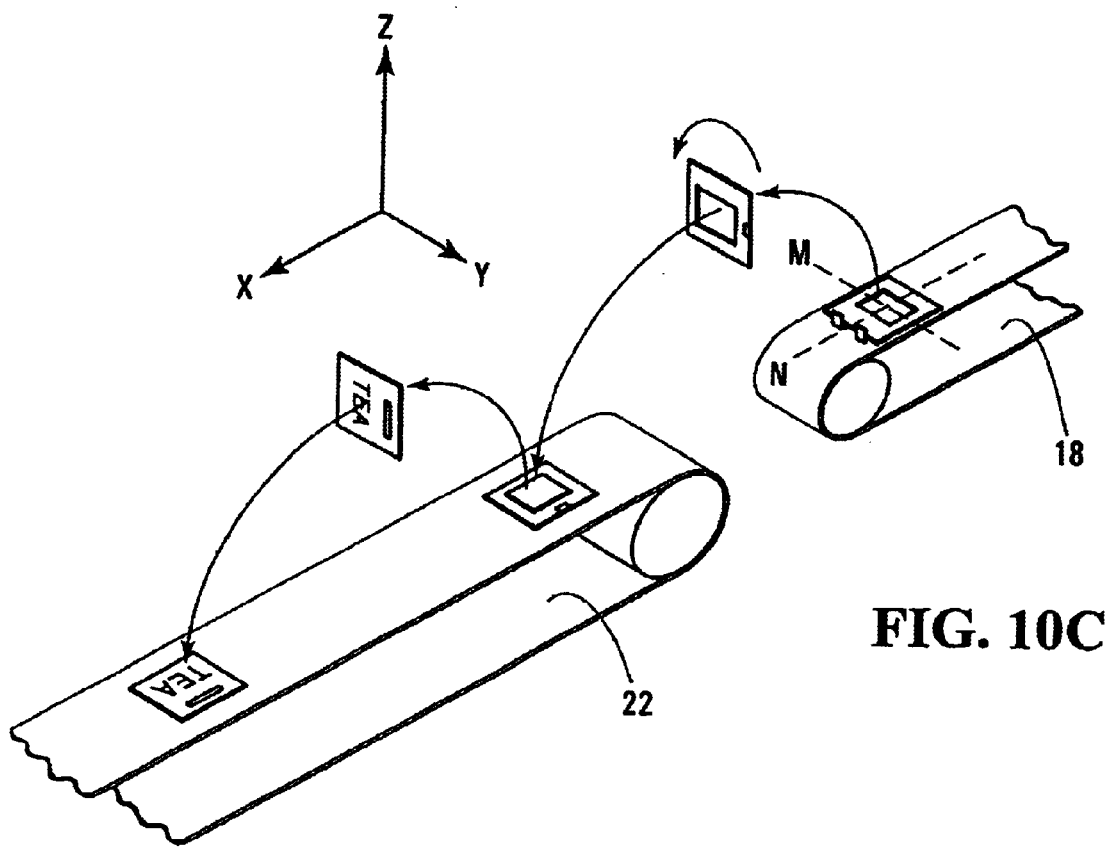

With reference to FIG. 10c, however, the pouch is delivered in an initial orientation that in order to place it in the same desired, transverse orientation, feeder 30c is also required. In FIG. 10c, the pouch is delivered and first by use of feeder 30a, the pouch has its longitudinal axis N rotated by plus 90 degrees longitudinally about a transverse axis y and also has its longitudinal axis N rotated transversely minus 90° about a longitudinal axis x. Then feeder 30b will rotate the transverse axis of the pouch M (which is oriented longitudinally) plus 90 degrees. This is the same operational sequence carried out in FIG. 10b. However, after those operations are accomplished by cooperation of feeders 30a and 30b, the pouch is still not in its desired orientation and instead of dropping off the pouch onto conveyor 22, feeder 30b then cooperates with feeder 30c to rotate the transverse axis M of the pouch an additional plus 180° about an axis y. Thus when the pouch is eventually released by feeder 30c onto conveyor 22, the pouch is in the same orientation as in FIGS. 10a and 10b.

Figure 10D:
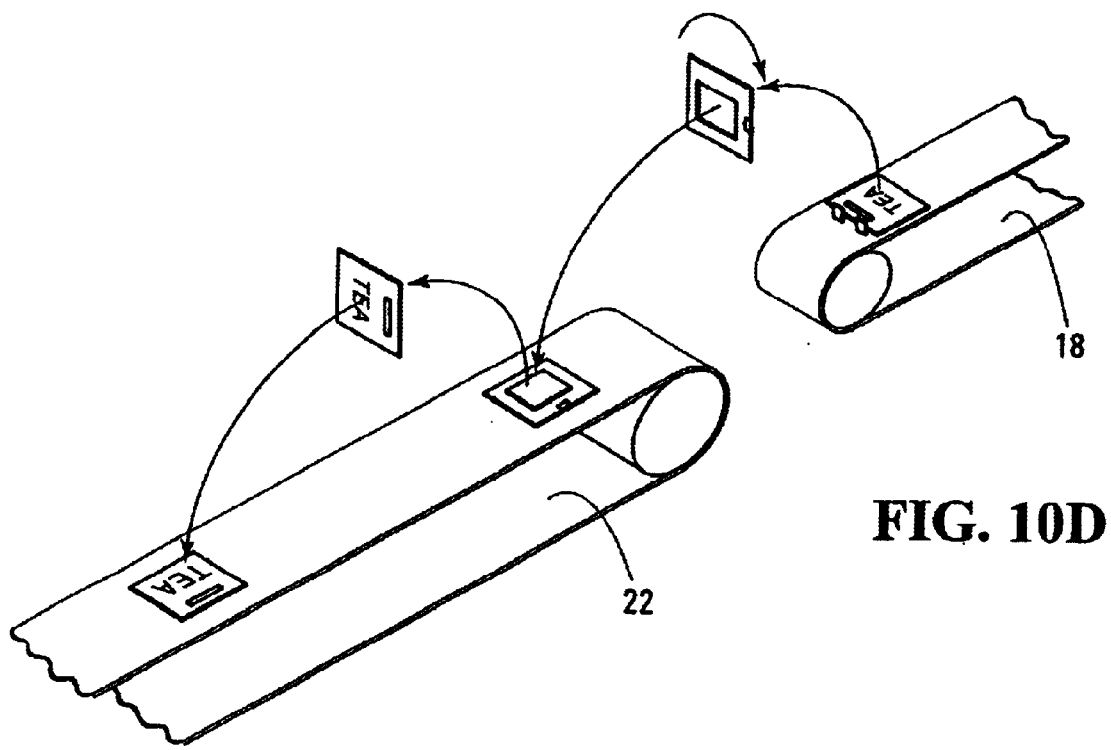

With reference to FIG. 10d, this illustrates the final one of the four possible longitudinal orientations at which the pouch can be delivered by conveyor 18. The operations required to reorient the pouch into the desired transverse orientation is similar to the operations described above in reference to FIG. 10c except that instead of feeder 30a rotating the longitudinal axis of the pouch transversely minus 90° about a longitudinal axis x, the feeder 30a rotates the longitudinal axis N of the pouch, plus ninety degrees about a longitudinal axis x.

In summary, depending upon which of the four initial longitudinal orientations the pouch is initially in, will determine which of the four operational sequences depicted in each of FIGS. 10a–d is performed on the pouch to achieve the same final transverse orientation.

Variations from the preferred embodiment described above, are contemplated within the scope of the invention. By way of example only, the system can be adapted to handle objects of different configurations than pouches. Also, the orientation apparatus can be configured and utilized to handle objects delivered to it in one of more or less than four possible orientations. The orientation apparatus may also be configured so that not all objects are oriented to the same final orientation by the apparatus. Furthermore, an orientation apparatus may be provided which has less than or more than three rotary feeders. Actuators may be provided on each of the feeders which are able to re-orient an object held by a pick up member by angles other than plus or minus 90 degrees.

We claim:

1. A system for orienting each of a plurality of objects from a first orientation that is one of several possible orientations, to a pre-selected second orientation, said system comprising:

a) an orientation apparatus for moving each of said plurality of objects from said first orientation which is one of said several possible orientations, to said pre-selected second orientation, and wherein at least one object of said plurality of objects has a first orientation that is a different orientation than the first orientation of another of said plurality of objects;

b) a sensor system for detecting which of said several possible orientations is said first orientation of each of said plurality of objects;

wherein said orientation apparatus comprises at least one rotary transfer device, said at least one rotary transfer device comprising:

a support;

a carrier member rotatably mounted to said support at a sun axis of rotation for rotation at a about said sun axis;

a pick up member mounted to said carrier member for selectively picking up an object when an object is located proximate said pick-up member, and selectively releasing an object, said pick up member having an actuator operable as to rotate said at least a part of said pick up member to rotate said object about an axis that is generally orthogonal to said sun axis as at least part of said movement sequence while said pick up member is holding said object;

a driving mechanism to rotate said carrier member to move said pick up member in a cyclical path about said sun axis;

said orientation apparatus operable to respond to a signal associated with each of said plurality of objects from said sensor system detecting said first orientation of said several possible orientations and to perform a pre-determined movement sequence selected from at least two different movement sequences that can be carried out by said orientation apparatus, on each of said plurality of objects dependent upon said detected first orientation, to move said object from said detected first orientation to said second orientation.

2. A system as claimed in claim 1, said system further comprising:

(a) a computer controller for receiving said signal from said sensor system indicating said first orientation of said object and for sending a signal to said orientation apparatus to carry out said movement sequence related to said first orientation to move each of said plurality of objects from said first orientations to said second orientation, wherein said sensor system is adapted to communicate with said computer controller said signal indicating said detected first orientations of each of said plurality of objects.

3. A system as claimed in claim 2 wherein said sensor system is a vision system adapted to identify indicia or markings associated with each of said objects when each of said objects is in said first orientation.

4. A system as claimed in claim 3 wherein said vision system includes a vision system controller in communication with said computer controller, and a camera system for providing an image of said object in said first orientations for processing by said vision system.

5. A system as claimed in claim 4 wherein each of said objects is a container.

6. A system as claimed in claim 5 wherein aid system further comprises a) a delivery system for delivering containers in series to a receiving station of said orientation apparatus, b) said computer controller for receiving an indication from said sensor system of the first orientation of each of said containers to be delivered in series to said receiving station by said delivery system and for sending a signal to said orientation apparatus to carry out one of a plurality of movement sequences on each container to move each one of said containers from said first said orientation to the pre-selected second orientation;

c) said orientation apparatus adapted to retrieve each said container in turn when they reach said receiving station and perform said one of said plurality of sequences of movement on each container to re-orient each said container from each said detected first orientation to said pre-selected second orientation.

7. A system as claimed in claim 3 wherein said vision system is adapted to identify indicia or marking located on each of said objects when each of said objects is in said first orientation.

8. A system as claimed in claim 7 wherein each of said objects is a container.

9. A system as claimed in claim 8 wherein each of said containers is a pouch.

10. A system as claimed in claim 1 wherein said first orientation of said object is one of four generally longitudinal orientations and said second orientation is a pre-selected generally transverse orientation.

11. A system as claimed in claim 1 wherein each of said objects is a container.

12. A system as claimed in claim 11 wherein each of said containers is a pouch.

13. A system as claimed in claim 11 wherein said system further comprises
   a) a delivery system for delivering containers in series to a receiving station of said orientation apparatus,
   b) said computer controller adapted for receiving an indication from said sensor system of the first orientation of each of said containers to be delivered in series to said receiving station by said delivery system and for sending a signal to said orientation apparatus to carry out a movement sequence on each container in turn to move each one of said containers from said first said orientation to the pre-selected second orientation;
   c) said orientation apparatus adapted to retrieve each said container in turn when they reach said receiving station and then perform a movement sequence dependent upon said detected first orientation to re-orient each said container from said detected first orientation to said pre-selected second orientation.

14. A system as claimed in claim 13 wherein said pre-selected second orientation for each of said plurality of objects is a common orientation.

15. A system as claimed in claim 14 said first orientations of said plurality of objects are generally longitudinal orientations and said pre-selected second orientation for each of said plurality of objects is a common generally transverse orientation.

16. A system as claimed in claim 13 wherein said pre-selected second orientation for each container is a common orientation.

17. A system as claimed in claim 13 wherein said first orientation of said containers is one of four different generally longitudinal orientations.

18. A system as claimed in claim 17 wherein said second orientation of each container is a common, pre-selected generally transverse orientation.

19. A system as claimed in claim 13 wherein said delivery system comprises a first conveyor adapted to move said containers in series to said receiving station and said orientation apparatus delivers said container to a delivery station in said pre-selected orientation.

20. A system as claimed in claim 13 wherein said delivery system comprises a first conveyor operable at variable speed to transport containers to said receiving station.

21. A system as claimed in claim 20 wherein said delivery system further comprises a feeder operable to feed said containers in series to a second conveyor, said second conveyor operable to deliver said containers to said first conveyor, said first conveyor being operable to accept containers from said second conveyor as they are delivered to said first conveyor.

22. A system as claimed in claim 21 wherein said containers are pouches.

23. A system as claimed in claim 11 wherein the operation of said actuator and the operation of said pick up member to pick up and release said containers, is controlled by said computer controller.

24. A system as claimed in claim 11 wherein said orientation apparatus comprises first and second rotary transfer devices, each of said first and second rotary transfer devices comprising:
   a support;
   a carrier member rotatably mounted to said support at a sun axis of rotation for rotation about said sun axis;
   a pick up member mounted to said carrier member for selectively picking up a container when a container is located proximate said pick-up member, and selectively releasing a container;
   a driving mechanism to rotate said carrier member and thus move said pick up member in a cyclical path;
   said first and second rotary transfer devices being arranged in series adjacent each other with each of said sun axes of said first and second rotary transfer devices are substantially parallel to each other, and so that the cyclical paths of the pick up member of said first rotary transfer device and said second rotary transfer device are positioned relative to each other so that the pick up member of said first rotary transfer device can pick up a container from one side of the container at a first position and rotate the container to a second position where the pick up member of second rotary transfer device can pick up the container from another side of the container, and the container can be released from the one side by said pick up member of said first rotary transfer device, and thereafter said pick up member of said second rotary transfer device can rotate said container to a third position, said rotation, release and pick up of said container by said pick up members of said first and second rotary transfer devices being at least part of said movement sequence.

25. A system as claimed in claim 24 wherein at least one of said pick up members has an actuator operable and configured to rotate said container while holding said container.

26. A system as claimed in claim 25 wherein said actuator is mounted on a pick up member of said first or second rotary transfer devices.

27. A system as claimed in claim 25 wherein said first and second rotary transfer devices are aligned in series in a longitudinal direction that is perpendicular to the sun axes of said first second and third rotary transfer devices, and said actuator is adapted to rotate said container about a longitudinal axis that is parallel to said longitudinal direction.

28. A system as claimed in claim 27 wherein said actuator is adapted to rotate said container about plus and minus ninety degrees from an initial pick up orientation, about an axis parallel to said longitudinal direction.

29. A system as claimed in claim 24 wherein said carrier members of said first and second rotary transfer devices are each rotatably mounted to their respective supports at a sun axis of rotation for rotation at a constant carrier angular velocity about each said sun axis.

30. A system as claimed in claim 11 wherein said orientation apparatus comprises first, second and third rotary transfer devices, each of said rotary transfer devices comprising:
- a support;
- a carrier member rotatably mounted to said support at a sun axis of rotation for rotation about said sun axis;
- a pick up member mounted to said carrier member for selectively picking up a container when a container is located proximate said pick-up member, and selectively releasing a container;
- a driving mechanism to rotate said carrier member at said constant angular velocity and thus move said pick up member in a cyclical path;
- said first, second and third rotary transfer devices being arranged in series adjacent each other with each of said sun axes of said first, second and third rotary transfer devices are substantially parallel to each other, and so that the cyclical paths of the pick up member of said first rotary transfer device, said second rotary transfer device and said third rotary transfer device are positioned relative to each other so that the pick up member of said first rotary transfer device can pick up a container from one side of the container at a first position and rotate the container to a second position where the pick up member of second rotary transfer device can pick up the container from another side of the container, and the container can be released from the one side by said pick up member of said first rotary transfer device, and thereafter said pick up member of said second rotary transfer device can rotate said container to a third position where said container may be released or may be rotated to a fourth position where the pick up member of said third rotary transfer device can pick up said container from a side of the container and the container be released from the another side by said pick up member of said second rotary transfer device, and thereafter said pick up member of said third rotary transfer device can rotate the container to a fifth position where said container can be released, whereby said container can be moved from said first orientation to said second orientation and said rotation, release and pick up of said container by said pick up members of said first, second and third rotary transfer devices is at least part of said movement sequence.

31. A system as claimed in claim 30 wherein at least one of said pick up members has an actuator operable and configured to rotate said container while holding said container.

32. A system as claimed in claim 31 wherein said actuator is mounted on a pick up member of said first or second rotary transfer devices.

33. A system as claimed in claim 32 wherein said first, second and third rotary transfer devices are aligned in a longitudinal direction that is perpendicular to the sun axes of said first second and third rotary transfer devices, and said actuator is adapted to rotate said container about a longitudinal axis that is parallel to said longitudinal direction.

34. A system as claimed in claim 33 wherein said actuator is adapted to rotate said container, about plus and minus ninety degrees from said pick up orientation about an axis parallel to said longitudinal direction.

35. A system as claimed in claim 30 wherein said carrier members of said first, second and third rotary transfer devices are each rotatably mounted to their respective supports at a sun axis of rotation for rotation at a constant carrier angular velocity about each said sun axis.

36. A system as claimed in claim 11 wherein said orientation apparatus comprises first, second and third rotary transfer devices, each of said first, second and third rotary transfer devices comprising
- a support;
- a carrier member rotatably mounted to said support at a sun axis of rotation for rotation at a constant carrier angular velocity w1 about said sun axis;
- a planetary unit rotatably mounted to said support at a planetary axis of rotation spaced from said sun axis of rotation at a distance D/2, said planetary unit mounted for rotation at a constant planetary angular velocity w2 about said planetary axis;
- a moon unit rotatably mounted to said planetary unit at a moon axis of rotation spaced from said planetary axis of rotation and said sun axis, said moon unit mounted for rotation at a constant moon angular velocity w3 about said moon axis;
- said moon unit having a pick up member for selectively picking up a container when a container is located proximate said pick-up member, and selectively releasing a container;
- said sun axis, planetary axis and moon axis being substantially parallel;
- a driving mechanism to rotate said carrier member, said planetary unit and said moon unit at said constant angular velocities w1, w2 and w3, at least one of said planetary unit and said moon unit being rotated in a direction opposite to said carrier member;
- said pick up member traveling a cyclical path having several vertices, and wherein the tangential velocity of said pick up member at each of said vertices is substantially equal to zero;
- said path of the pick up member of the first rotary transfer device having a vertex which is proximate one of the vertices of the path of the pick up member of the second rotary transfer device; and said path of the pick up member of the second rotary transfer device having a second vertex which is proximate one of the vertices of the path of the pick up member of the third rotary transfer device;
- said first, second and third rotary transfer devices being arranged in series adjacent each other with each of said sun axes of said first, second and third rotary transfer devices being substantially parallel to each other, and so that said first rotary transfer device, said second rotary transfer device and said third rotary transfer device are positioned relative to each other so that as at least part of said movement sequence comprises the pick up member of said first rotary transfer device picking up a container from one side of the container at a first position when said pick up member is substantially at a first vertex of its path, and rotating the container to a second position where the pick up member of second rotary transfer device being substantially at a first vertex of its path can pick up the container from another side of the container, and the container can be released from the one side by said pick up member of said first rotary transfer device substantially at a second vertex of its path, and thereafter said pick up member of said second rotary transfer device rotating said container to a third position where said pick up member of said second rotary transfer device is substantially at a second vertex of its path and where said container may be released, or may be rotated to a fourth position where the pick up member of said second rotary transfer device is substantially at a third vertex of its path and where the pick up member of said third rotary transfer device is substantially at a first vertex of its path and can pick up said container from a side of the container and the container be released from the another side by said pick up member of said second rotary transfer device while substantially at its third vertex of its path, and thereafter said pick up member of said third rotary transfer device can rotate the container to a fifth position where said container can be released where said pick up member of said third rotary transfer device is substantially at a second vertex of its path, whereby said container can be moved from first orientation to said second orientation.

37. A system as claimed in claim 36 wherein said planetary unit is rotated in a direction opposite to said carrier member and said moon unit.

38. A system as claimed in claim 37 wherein at least one of said pick up members has an actuator operable and configured to rotate said container while holding said container.

39. A system as claimed in claim 38 wherein said actuator is mounted on a pick up member of said first or second rotary transfer devices.

40. A system as claimed in claim 39 wherein said rotary transfer devices are aligned in series in a longitudinal direction that is substantially perpendicular to the sun axes of said first second and third rotary transfer devices, and said actuator is adapted to rotate said container about a longitudinal axis that is generally parallel to said longitudinal direction.

41. A system as claimed in claim 40 wherein said actuator is adapted to rotate said container about plus and minus ninety degrees from an initial pick up orientation, about an axis parallel to said longitudinal direction.

42. A system as claimed in claim 36 wherein said carrier members of said first, second and third rotary transfer devices are each rotatably mounted to their respective supports at a sun axis of rotation for rotation at a constant carrier angular velocity about each said sun axis.

43. A system as claimed in claim 11 comprising first, second and third rotary transfer devices, each of said first, second and third rotary transfer devices comprising:
   a support;
   a carrier member rotatably mounted to said support at a sun axis of rotation for rotation at a constant carrier angular velocity about said sun axis;
   a pick up member mounted to said carrier member for selectively picking up a container when a container is located proximate said pick-up member, and selectively releasing a container;
   a driving mechanism to rotate said carrier member at said constant angular velocity and thus move said pick up member in a cyclical path;
   said first, second and third rotary transfer devices arranged in series and in longitudinal alignment between said receiving station and a delivery station, said second rotary transfer device being positioned between said second and third rotary transfer devices;
   said containers having a longitudinal axis aligned with said longitudinal alignment of said rotary transfer devices when said container is at said receiving station, and a transverse axis perpendicular to said longitudinal axis;
   said pick-up member of said first rotary transfer device operable to pick a container aligned longitudinally on said conveyor system proximate said receiving station from a first side of said container and during rotation of said first rotary transfer device, rotate said container from a first position to a second transfer position whereby said container is rotated about a transverse axis from a first orientation to a second orientation which is substantially plus 90 degrees to said first orientation, and said first and second rotary transfer devices being operable such that at a second position said first side of said container can be released from said first object pick up member and be picked up by a second pick up member of said second rotary transfer device from a second side of said container to transfer said container from said pick up member to said first rotary device to said pick up member of said second rotary device;
   said second rotary transfer device operable to rotate to rotate said pick up member of said second rotary transfer device to rotate said container from said second transfer position to a third delivery position whereby said container is again rotated about a transverse axis from said second orientation to a third orientation which is substantially plus 90 degrees to said second orientation, at where said container can be released if already oriented in said pre-selected second orientation, and otherwise said second rotary transfer device operable to thereafter rotate said container to a fourth transfer position, whereby said container is rotated about a transverse axis from said third orientation to a fourth orientation which is substantially plus 90 degrees to said third orientation, and wherein at said fourth transfer position said rotary transfer device is operable such that a third pick up member of said third rotary transfer device can pick up said container from a side other than said second side, as it is released by said second pick up member of said second rotary transfer device from said second side of said container to transfer said container from a pick up member of said second rotary transfer device to a pick up member of said third rotary transfer device, and whereby said third rotary transfer member is operable to rotate said container to a fifth delivery position where said container can be returned to said conveyor system and whereby during rotation from said fourth transfer position to said fifth delivery position said container is rotated about a transverse axis from said third orientation to a fifth orientation which is substantially plus 90 degrees to said fourth orientation; and
   wherein said at least one of said first and second object pick up members has an actuator operable to further rotate said container plus or minus 90 degrees about a longitudinal axis, such that said container is oriented transversely.

44. A system as claimed in claim 1 wherein said first orientation is one of four possible longitudinal orientations, each of said four possible longitudinal orientations being orthogonal to each other.

45. A system as claimed in claim 1 wherein said pre-selected second orientation is a transverse orientation at ninety degrees to said longitudinal orientations.

46. A system as claimed in claim 1 wherein the operation of said pick up member to pick up and release said objects, is controlled by a computer controller.

47. A system as claimed in claim 1 wherein the operation of said pick up member to pick up and release said container, is controlled by a computer controller.

48. A system as claimed in claim 1 wherein said carrier member is rotatably mounted to said support at a sun axis of rotation for rotation at a constant carrier angular velocity about said sun axis.

49. A system as claimed in claim 1 wherein at said pick up member has an actuator operable and configured to rotate said container while holding said container.

50. A system as claimed in claim 49 wherein said actuator is mounted on a pick up member for rotation about an axis that is substantially orthogonal to said sun axis.

51. A system for orienting an object from a first orientation to a second orientation comprising first and second rotary transfer devices, each of said first and second rotary transfer devices comprising:
   a support;
   a carrier member rotatably mounted to said support at a sun axis of rotation for rotation about said sun axis;
   a pick up member mounted to said carrier member for selectively picking up an object when a container is located proximate said pick-up member, and selectively releasing said object;
   a driving mechanism to rotate said carrier member and thus move said pick up member in a cyclical path about said sun axis;
   said first and second rotary transfer devices being arranged in series adjacent each other with each of said sun axes of said first and second rotary transfer devices being substantially parallel to each other, and such that the cyclical paths of the pick up member of said first rotary transfer device and said second rotary transfer device are positioned relative to each other so that the pick up member of said first rotary transfer device can pick up a container from one side of the object at a first position and rotate the container to a second position where the pick up member of second rotary transfer device can pick up the container from another side of the container, and the container can be released from the one side by said pick up member of said first rotary transfer device, and thereafter said pick up member of said second rotary transfer device can rotate said container to a third position, said rotation, release and pick up of said container by said pick up members of said first and second rotary transfer devices being at least part of said movement sequence.

52. A system as claimed in claim 51 wherein said object is a container.

53. A system as claimed in claim 52 wherein said container is a pouch.

54. A system as claimed in claim 51 wherein a plurality of objects are moved in turn by said pick up member from said first orientation to a pre-selected second orientation.

55. A system as claimed in claim 54 wherein said pre-selected second orientation for each of said plurality of objects is a common orientation.

56. A system as claimed in claim 51 wherein said pick up member of at least one of said first and second rotary transfer devices has an actuator operable and configured to rotate said object while holding said object.

57. A system as claimed in claim 56 wherein said rotary transfer devices are aligned in series in a longitudinal direction that is substantially perpendicular to the sun axes of said first second and third rotary transfer devices, and said actuator is adapted to rotate said container about a longitudinal axis that is generally parallel to said longitudinal direction.

58. A system for orienting an object from a first orientation to a second orientation comprising first, second and third rotary transfer devices, each of said first, second and third rotary transfer devices comprising
   a support;
   a carrier member a carrier member rotatably mounted to said support at a sun axis of rotation for rotation about said sun axis;
   a pick up member mounted to said carrier member for selectively picking up an object when a container is located proximate said pick-up member, and selectively releasing said object;
   a driving mechanism to rotate said carrier member and thus move said pick up member in a cyclical path about said sun axis;
   said pick up member traveling a cyclical path having several vertices;
   said path of the pick up member of the first rotary transfer device having a vertex which is proximate one of the vertices of the path of the pick up member of the second rotary transfer device; and said path of the pick up member of the second rotary transfer device having a second vertex which is proximate one of the vertices of the path of the pick up member of the third rotary transfer device;
   said first, second and third rotary transfer devices being arranged in series adjacent each other with each of said sun axes of said first, second and third rotary transfer devices being substantially parallel to each other, and so that said first rotary transfer device, said second rotary transfer device and said third rotary transfer device are positioned relative to each other so that as at least part of said movement sequence comprises the pick up member of said first rotary transfer device picking up a container from one side of the container at a first position when said pick up member is substantially at a first vertex of its path, and rotating the container to a second position where the pick up member of second rotary transfer device being substantially at a first vertex of its path can pick up the container from another side of the container, and the container can be released from the one side by said pick up member of said first rotary transfer device substantially at a second vertex of its path, and thereafter said pick up member of said second rotary transfer device rotating said container to a third position where said pick up member of said second rotary transfer device is substantially at a second vertex of its path and where said container may be released, or may be rotated to a fourth position where the pick up member of said second rotary transfer device is substantially at a third vertex of its path and where the pick up member of said third rotary transfer device is substantially at a first vertex of its path and can pick up said container from a side of the container and the container be released from the another side by said pick up member of said second rotary transfer device while substantially at its third vertex of its path, and thereafter said pick up member of said third rotary transfer device can rotate the container to a fifth position where said container can be released where said pick up member of said third rotary transfer device is substantially at a second vertex of its path, whereby said container can be moved from first orientation to said second orientation.

59. A system as claimed in claim 58 wherein at least one of said pick up members has an actuator operable and configured to rotate said container while holding said container.

60. A system as claimed in claim 59 wherein said actuator is mounted on a pick up member of said first or second rotary transfer devices.

61. A system as claimed in claim 60 wherein said rotary transfer devices are aligned in series in a longitudinal direction that is substantially perpendicular to the sun axes of said first, second and third rotary transfer devices, and said actuator is adapted to rotate said container about a longitudinal axis that is generally parallel to said longitudinal direction.

* * * * *